(12) United States Patent
Yoo et al.

(10) Patent No.: US 7,351,600 B2
(45) Date of Patent: Apr. 1, 2008

(54) LIQUID CRYSTAL DISPLAY DEVICE AND FABRICATING METHOD THEREOF

(75) Inventors: Soon Sung Yoo, Gunpo-si (KR); Oh Nam Kwon, Yongin-si (KR); Heung Lyul Cho, Suwon-si (KR); Seung Hee Nam, Suwon-si (KR)

(73) Assignee: LG. Philips LCD. Co., Ltd, Seoul (KR)

( * ) Notice: Subject to any disclaimer, the term of this patent is extended or adjusted under 35 U.S.C. 154(b) by 377 days.

(21) Appl. No.: 11/172,036

(22) Filed: Jun. 30, 2005

(65) Prior Publication Data

US 2006/0138426 A1    Jun. 29, 2006

(30) Foreign Application Priority Data

Dec. 29, 2004    (KR) .................. 10-2004-0115739

(51) Int. Cl.
*H01L 21/00* (2006.01)
*H01L 21/84* (2006.01)
(52) U.S. Cl. ........................... 438/30; 438/158
(58) Field of Classification Search ............ 438/30–35, 438/149–159
See application file for complete search history.

(56) References Cited

U.S. PATENT DOCUMENTS 6,958,252 B2 * 10/2005 Kim ............................. 438/34
7,220,611 B2 * 5/2007 Chang et al. .................. 438/30
7,279,370 B2 * 10/2007 Lim et al. ..................... 438/155

* cited by examiner

*Primary Examiner*—Cuong Nguyen
(74) *Attorney, Agent, or Firm*—Brinks Hofer Gilson & Lione

(57) ABSTRACT

A liquid crystal display device according to an embodiment of the present invention includes: a gate line formed on a substrate; a data line to provide a pixel area by crossing the gate line with a gate insulating film therebetween; a common line formed in parallel to the gate line; a thin film transistor connected to the gate line and the data line; a passivation film formed to cover the thin film transistor; a contact hole which penetrates the passivation film; a pixel electrode connected with the thin film transistor; and a common electrode connected with the common line to form a horizontal electric field with the pixel electrode, and wherein at lease one of the gate line, the data line, the common line, the pixel electrode and the common electrode is composed of a first conductive layer and a second conductive layer which is formed to cover the first conductive layer by being extended more outward than the first conductive layer, and is formed to have a border with the passivation film within the contact hole.

10 Claims, 23 Drawing Sheets

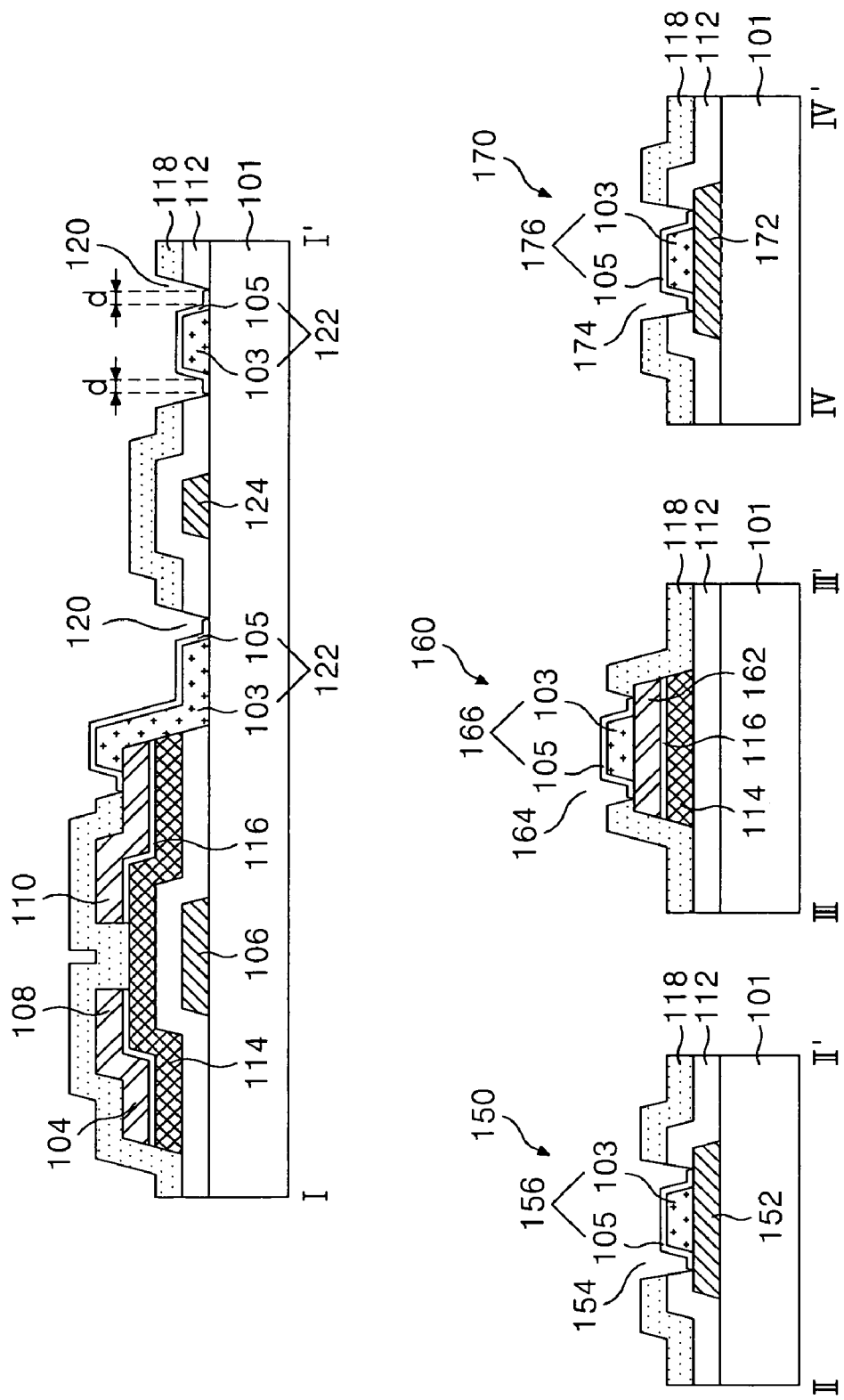

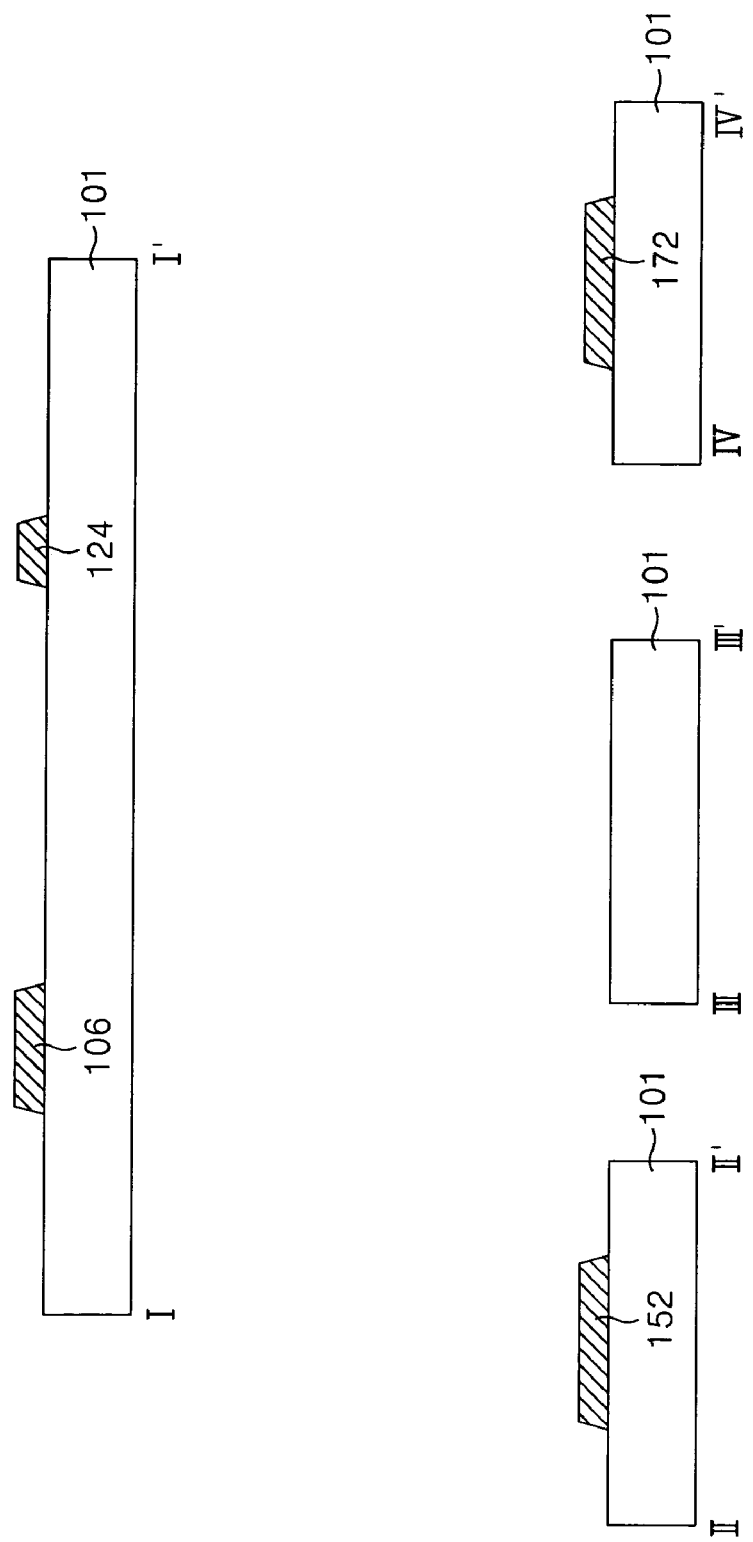

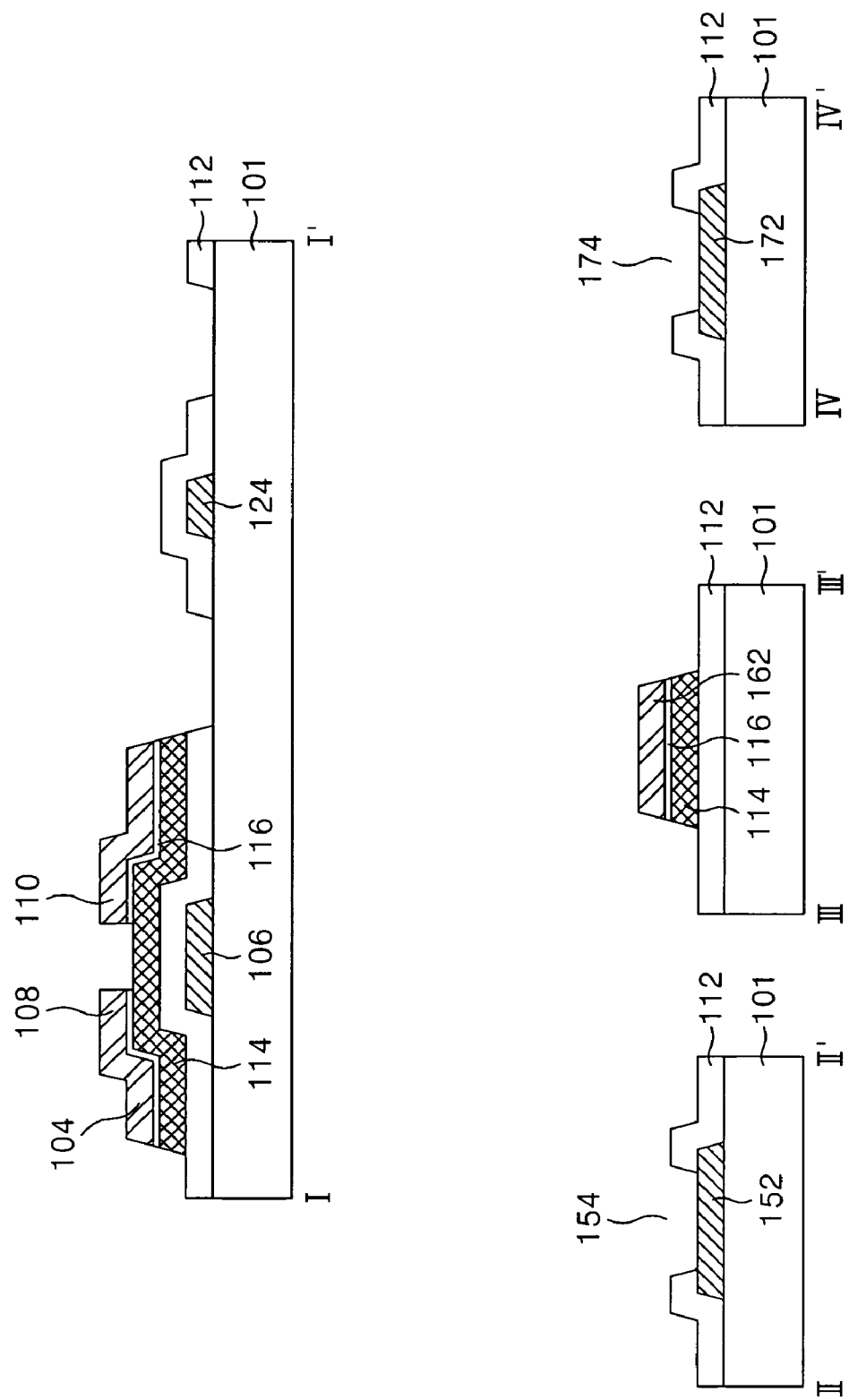

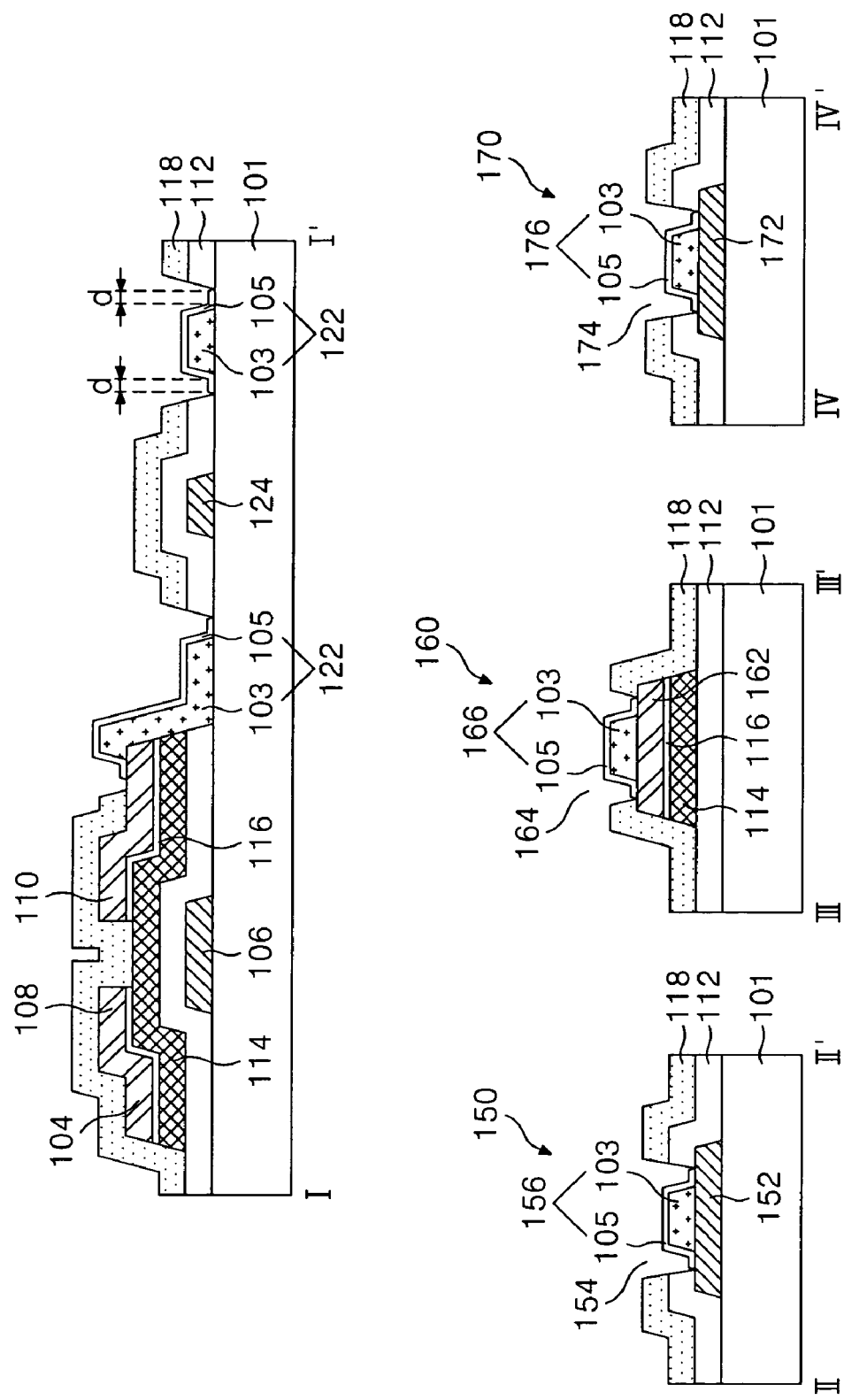

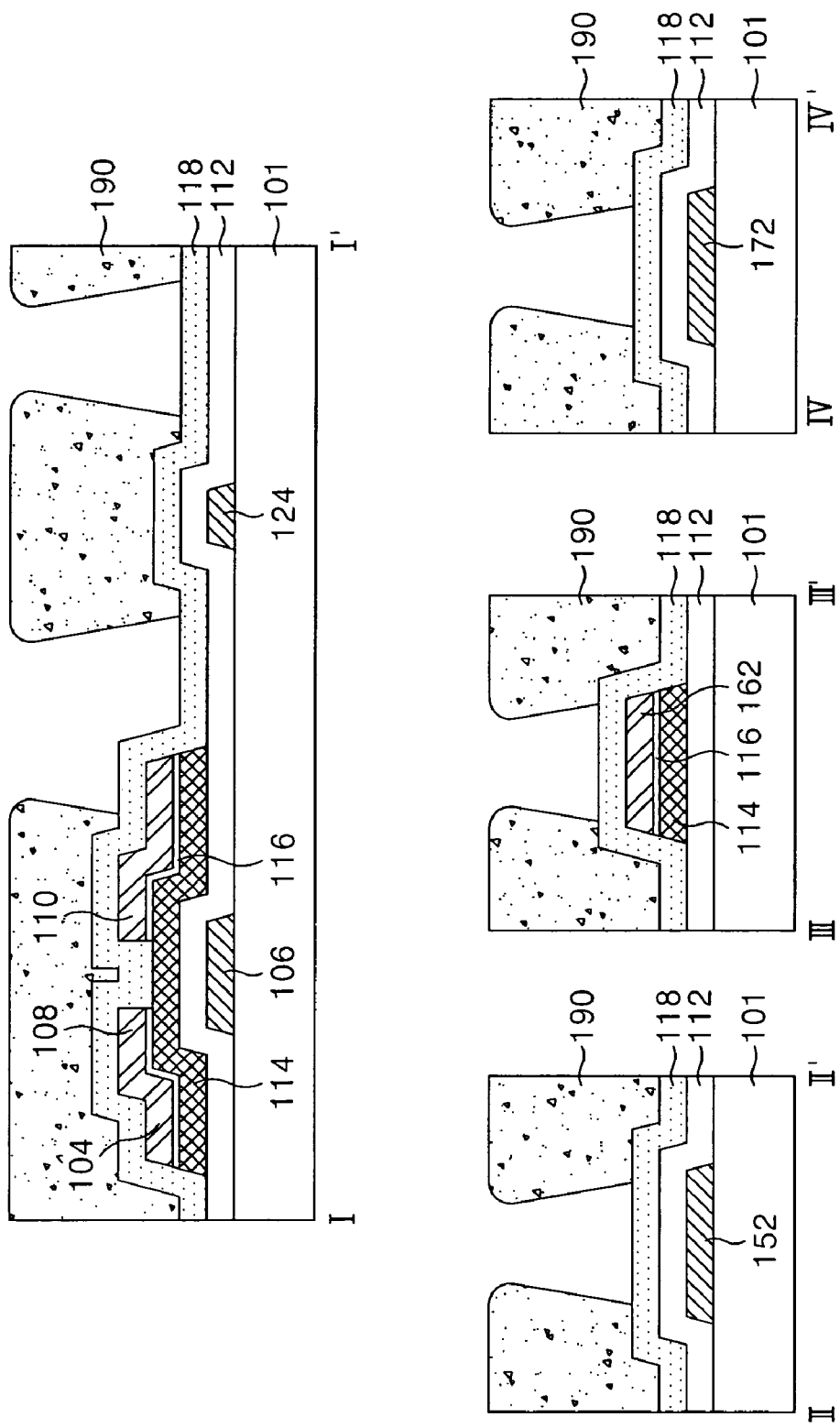

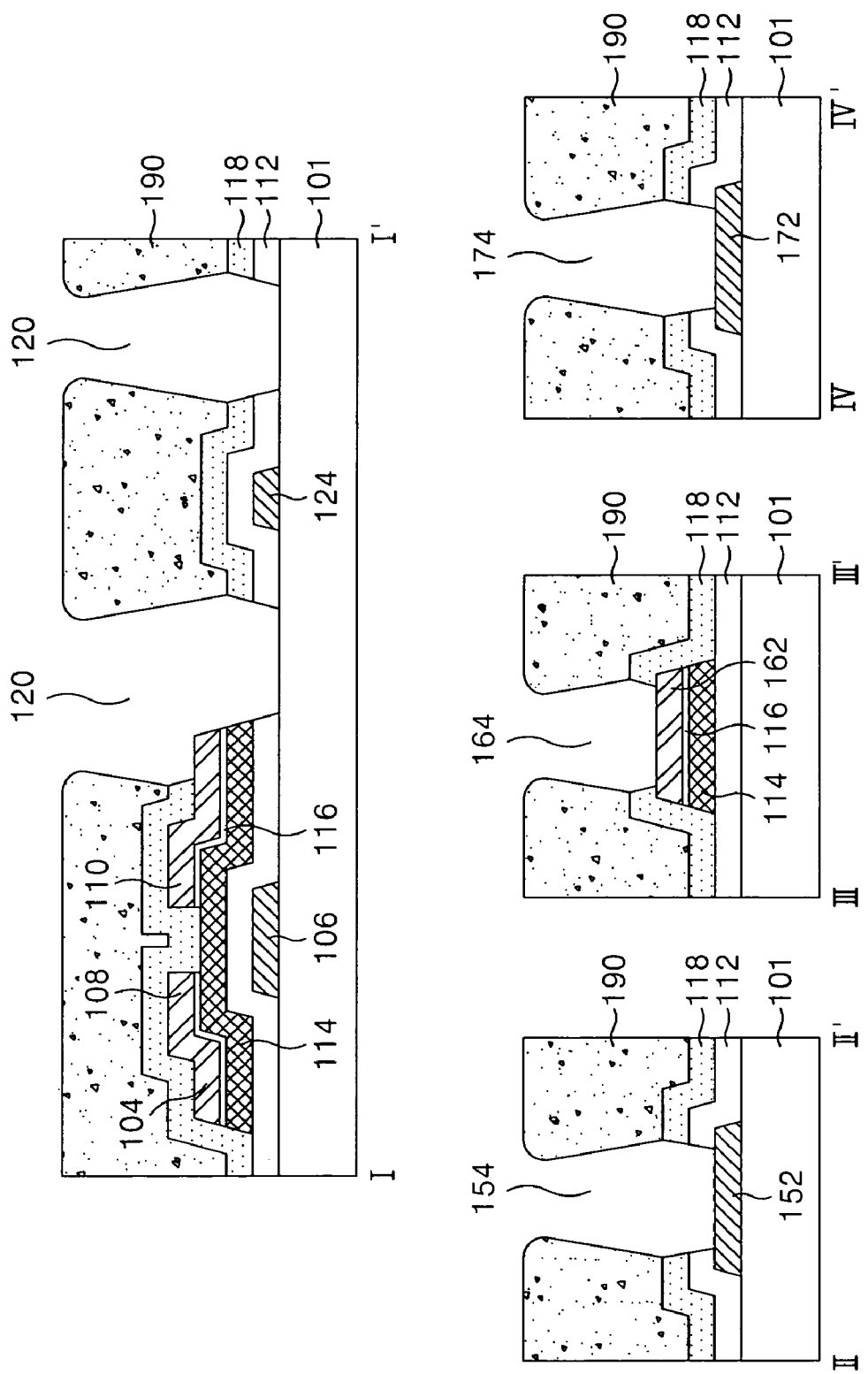

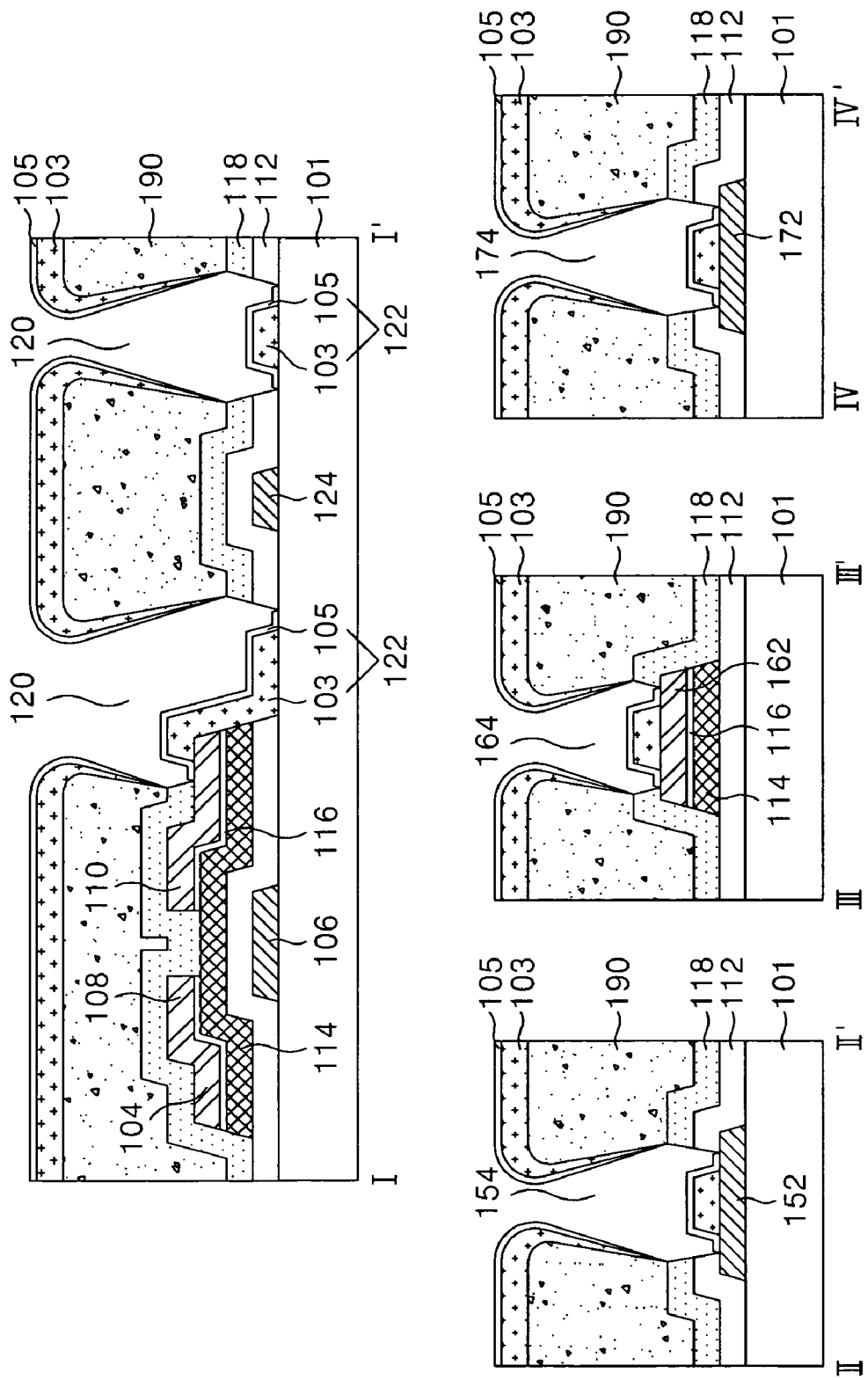

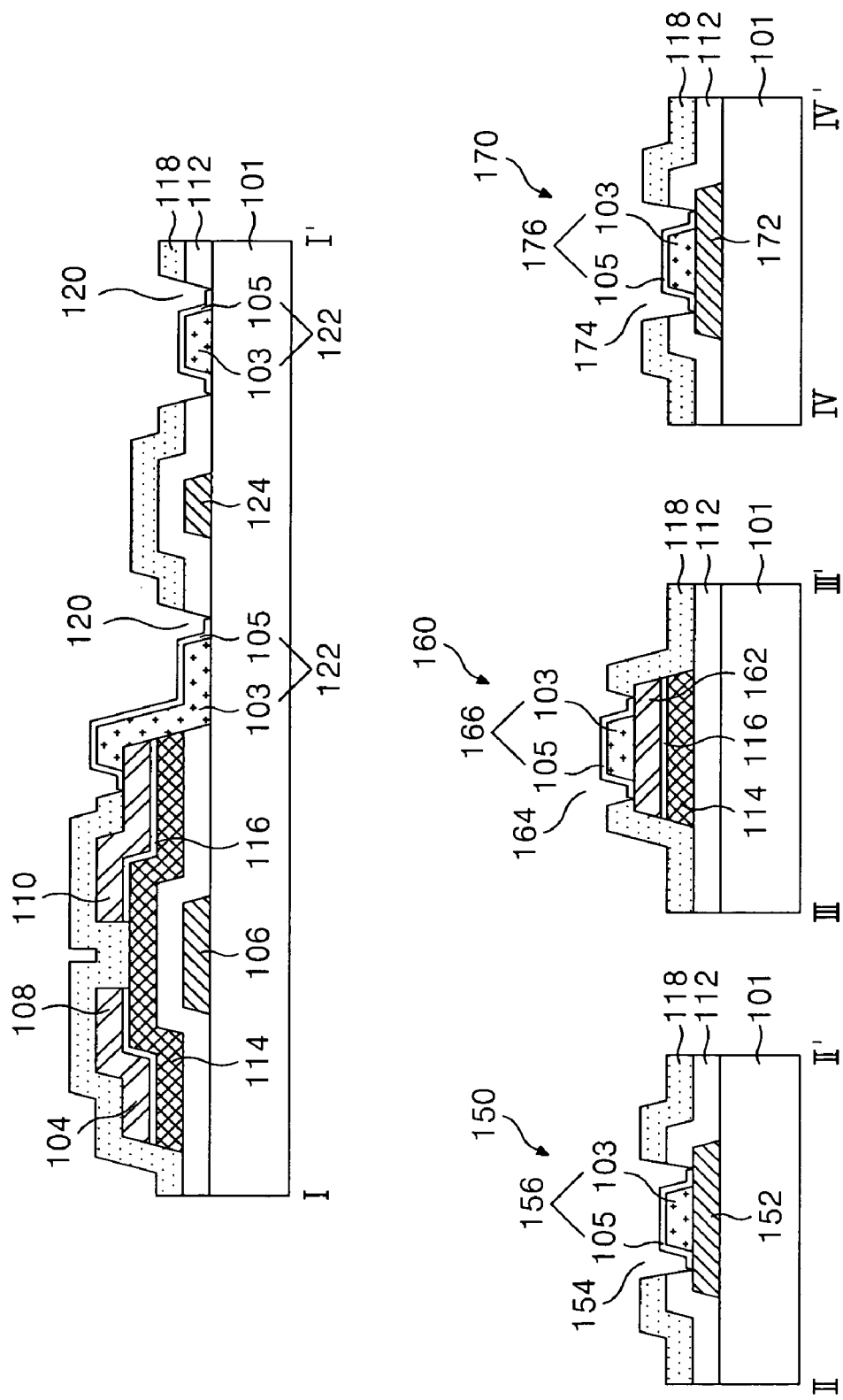

FIG. 9B
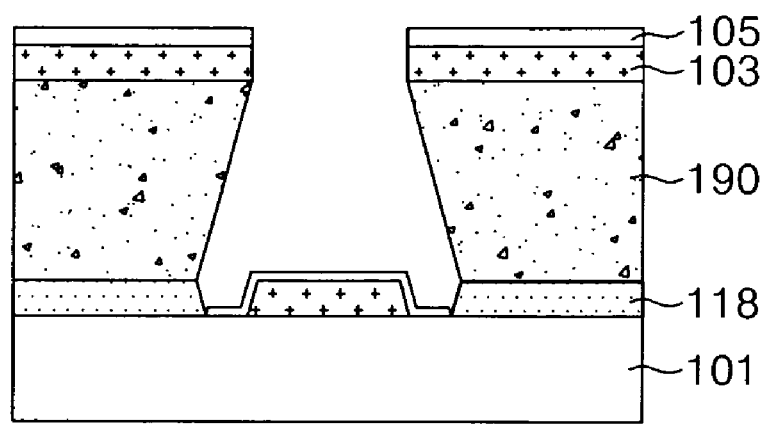
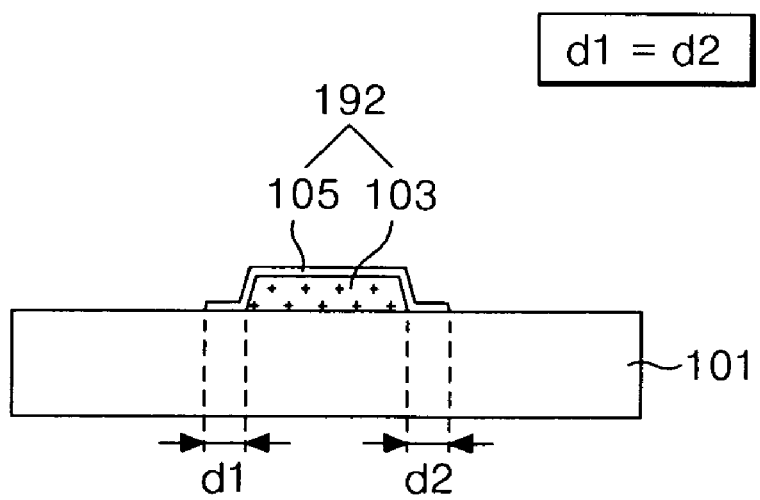
$d1 = d2$

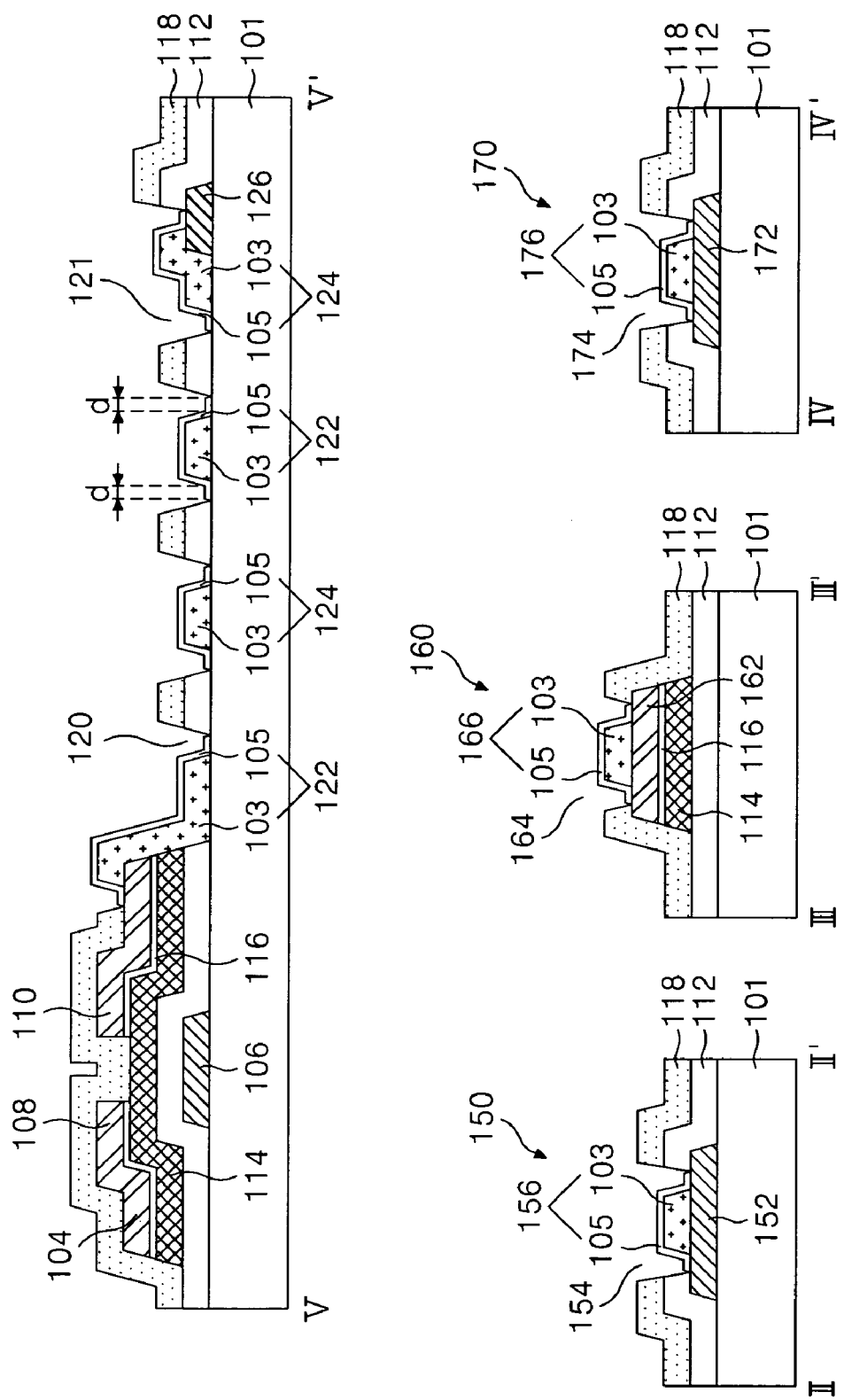

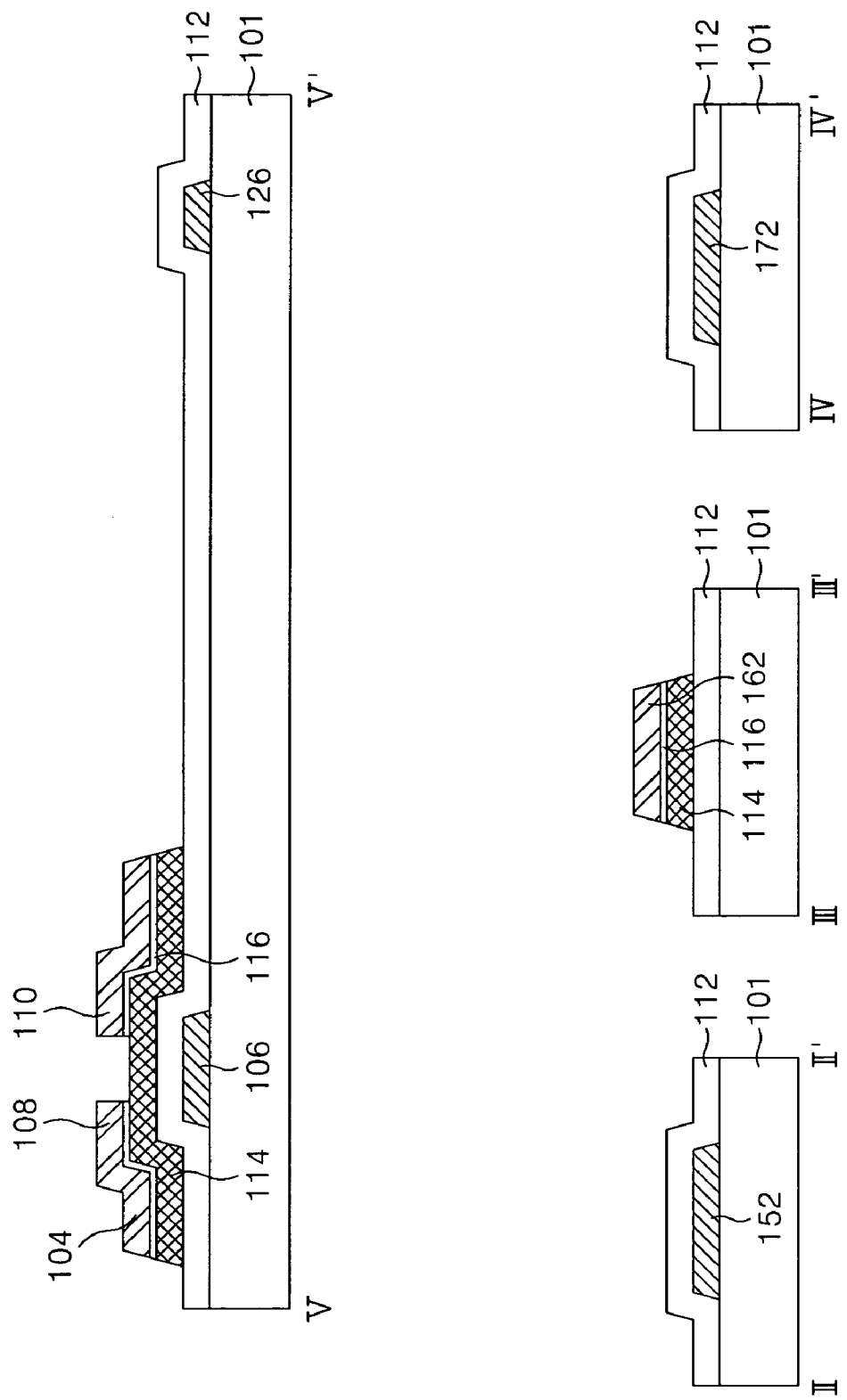

LIQUID CRYSTAL DISPLAY DEVICE AND FABRICATING METHOD THEREOF

This application claims the benefit of the Korean Patent Application No. P2004-115739 filed on Dec. 29, 2004, which is hereby incorporated by reference.

TECHNICAL FIELD

The present invention relates to a liquid crystal display device using a horizontal electric field, and more particularly to a liquid crystal display device that is adaptive for simplifying the process, and a fabricating method thereof.

BACKGROUND

A liquid crystal display device controls the light transmissivity of liquid crystal by use of electric field, thereby displaying a picture. The liquid crystal display device, as shown in FIG. 1, includes a thin film transistor substrate 70 and a color filter substrate 80 which face each other to be bonded together with a liquid crystal 76 therebetween.

In the color filter substrate 80, a color filter array including a black matrix 68 for preventing light leakage, a color filter 62 for realizing color, a common electrode 64 forming a vertical electric field with a pixel electrode 72, and an upper alignment film (not shown) which is spread thereover for aligning the liquid crystal is formed on an upper substrate 11.

In the thin film transistor substrate 70, a thin film transistor array including a gate line 82 and a data line 74 formed to cross each other, a thin film transistor 58 formed at an intersection thereof 82, 74, a pixel electrode 72 connected to the thin film transistor 58, a lower alignment film spread thereover for aligning the liquid crystal is formed on a lower substrate 21. Also, the thin film transistor substrate further includes a gate pad 78 extended from the gate line 82 and a data pad 66 extended from the data line 74.

The liquid crystal display device has the common electrode formed on the upper substrate 80 and the pixel electrode formed on the lower substrate 70 arranged to face each other, and drives the liquid crystal 76 of twisted nematic TN mode by the vertical electric field which is formed therebetween. The vertical electric field type liquid crystal display has an advantage in that its aperture ratio is high, but a disadvantage in that its viewing angle is narrow to be about 90 degree.

Accordingly, there has recently been proposed a horizontal electric field type liquid crystal display device having a wide viewing angle of about 160 degree by driving a liquid crystal of in-plane switching (IPS) mode by a horizontal electric field between the pixel electrode and the common electrode which are arranged in parallel on the lower substrate.

In the IPS mode liquid crystal display device, the thin film transistor substrate includes a semiconductor process and requires a plurality of mask processes, thus its fabricating process become complicated to be a main factor of the cost increase in fabricating the liquid crystal display panel. In order to solve this problem, the thin film transistor substrate has been developing in a direction of reducing the number of mask processes. This is because one mask process includes many sub-processes such as a thin film deposition process, a cleaning process, a photolithography process, an etching process, a photo-resist peeling process, an inspection process and so on. Accordingly, there is recently required a thin film transistor substrate and a fabricating method thereof that might be able to reduce the fabricating cost by reducing the fabricating process of the thin film transistor substrate.

SUMMARY

In order to achieve these and other advantages of the invention, a liquid crystal display device according to an aspect of the present invention includes a gate line formed on a substrate; a data line crossing the gate line with a gate insulating film therebetween and defining a pixel area on the substrate; a common line formed in parallel to the gate line; a thin film transistor connected to the gate line and the data line; a passivation film overlying the thin film transistor; a contact hole through the passivation film; a pixel electrode connected to the thin film transistor; and a common electrode connected to the common line to form a horizontal electric field with the pixel electrode, and wherein at lease one of the gate line, the data line, the common line, the pixel electrode and the common electrode includes a structure including a first conductive layer and a second conductive layer overlying the first conductive layer and extending more outward than the first conductive layer, and residing within a boarder defined by the passivation film within the contact hole.

In the liquid crystal display device, the pixel electrode is composed of the structure.

In the liquid crystal display device, the common electrode includes the same metal as the gate line, and wherein the common electrode underlies the gate insulating film and the passivation film.

In the liquid crystal display device, the common electrode includes the structure.

In the liquid crystal display device, the common line is exposed through the contact hole and controls the common electrode.

The liquid crystal display device further includes a gate pad lower electrode connected to the gate line; a second contact hole which penetrates the gate insulating film and the passivation film to expose a portion of the gate pad lower electrode; and a gate pad having a gate pad upper electrode which residing within a border defined by the passivation film within the second contact hole and includes the first conductive layer and the second conductive layer overlying the first conductive layer by being extended more outward than the first conductive layer.

The liquid crystal display device further includes a data pad lower electrode connected to the data line; a third contact hole penetrating the passivation film and exposing a portion of the data pad lower electrode; and a data pad having a data pad upper electrode residing within a boarder defined by the passivation film within the third contact hole and including the first conductive layer and the second conductive layer which is formed to cover the first conductive layer by being extended more outward than the first conductive layer.

In the liquid crystal display device, the width of the second conductive layer is the same in four sides of the second conductive layer.

In the liquid crystal display device, the first conductive layer includes one or more of Ag, Cu, Mo, Cr or W, and the second conductive layer is a transparent conductive material.

The liquid crystal display device further includes a redundancy line which overlaps any one of the signal line, the gate line, the data line, and the common line with at least one of the gate insulating film and the passivation film therebetween, and wherein the redundancy line includes the first conductive layer and the second conductive layer.

A fabricating method of a liquid crystal display device according to another aspect of the present invention includes: performing a first mask process including forming a first conductive pattern group having a gate line on a substrate, a gate electrode connected to the gate line, a common line formed in parallel to the gate line and a common electrode connected to the common line; forming a gate insulating film overlying the first conductive pattern group; a second mask process including forming a second conductive pattern group having a data line crossing the gate line on the gate insulating film and defining a pixel area, a source electrode connected with the data line, and a drain electrode opposite to the source electrode, and a semiconductor pattern forming a channel between the source electrode and the drain electrode; forming a passivation film to cover the second conductive pattern group and the semiconductor pattern; a third mask process including forming a contact hole penetrating the passivation film and the gate insulating film, and a third conductive pattern group within a border defined by the passivation film within the contact hole and having a pixel electrode constituting a horizontal electric field with the common electrode, and wherein the pixel electrode includes a first conductive layer and a second conductive layer overlying the first conductive layer and extending more outward than the first conductive layer.

The fabricating method further includes the steps of forming a gate pad lower electrode connected to the gate line during the first mask process; and forming a second contact hole penetrating the gate insulating film and the passivation film and exposing the gate pad lower electrode during the third mask process, and forming a gate pad upper electrode within a border defined by the passivation film within the second contact hole, the upper electrode comprising a first conductive layer and a second conductive layer overlying the first conductive layer and extending more outward than the first conductive layer.

The fabricating method further includes the steps of forming a data pad lower electrode connected with the data line during the second mask process; and forming a third contact hole penetrating the passivation film and exposing the data pad lower electrode during the third mask process, and a data pad upper electrode which is formed within a border defined by the passivation film within the third contact hole, the upper electrode comprising a first conductive layer and a second conductive layer overlying the first conductive layer and extending more outward than the first conductive layer.

In the fabricating method, third mask process includes the steps of forming a photo resist pattern of a reverse taper shape on the passivation film; forming the contact hole by etching the protective film using the photo resist pattern as a mask; forming the first and second conductive layers overlying the photo resist pattern; and forming a pixel electrode by removing the photo resist pattern, wherein the first and second conductive layers remain in the third contact hole.

In the fabricating method, forming the photo resist pattern includes exposing and developing a negative type photo resist.

In the fabricating method, the width of the second conductive layer is the same in four sides of the second conductive layer.

In the fabricating method, the first conductive layer includes one or more of Ag, Cu, Mo, Cr or W, and the second conductive layer is of a transparent conductive material.

In a fabricating method of a liquid crystal display device that includes a gate line on a substrate, a data line to provide crossing the gate line with a gate insulating film therebetween and defining a pixel area, a common line formed in parallel to the gate line, a thin film transistor connected to the gate line and the data line, a passivation film overlying the thin film transistor, a contact hole penetrating the passivation film, a pixel electrode connected to the thin film transistor, and a common electrode connected to the common line to form a horizontal electric field with the pixel electrode. According to another aspect of the present invention, the step of forming at least one of the gate line, the data line, the common line, the pixel electrode and the common electrode includes the steps of: forming an insulation film on the substrate; forming a photo resist pattern of a reverse taper shape on the insulation film; forming a contact hole by etching the insulation film using the photo resist pattern as a mask; forming a first conductive layer having a first width within the contact hole to cover the photo resist pattern; forming a second conductive layer to cover the first conductive layer by having it extended more outward than the first conductive layer, wherein the second conductive layer has a second width which is wider than the first width; and patterning the first and second conductive layers by removing the photo resist pattern in which the first and second conductive layers remain behind.

In the fabricating method, at least one of the pixel electrode or the common electrode is composed of the first conductive layer and the second conductive layer overlying the first conductive layer and within a border defined by the passivation film within the contact hole.

BRIEF DESCRIPTION OF THE DRAWINGS

These and other objects of the invention will be apparent from the following detailed description of the embodiments of the present invention with reference to the accompanying drawings, in which:

FIG. 3 is a sectional diagram illustrating a thin film transistor substrate taken along the lines I-I', II-II', III-III' and IV-IV' in FIG. 2.

FIGS. 4A and 4B are a plane view and a sectional diagram, respectively, illustrating a first mask process of fabricating the thin film transistor substrate according to the first embodiment of the present invention;

FIGS. 5A and 5B are a plane view and a sectional diagram, respectively, illustrating a second mask process of fabricating the thin film transistor substrate according to the first embodiment of the present invention;

FIGS. 6A and 6B are a plane view and a sectional diagram, respectively, illustrating a third mask process of fabricating the thin film transistor substrate according to the first embodiment of the present invention;

FIGS. 7A to 7D are sectional diagrams illustrating in detail the third mask process of fabricating the thin film transistor substrate according to the first embodiment of the present invention;

FIGS. 9A and 9B are sectional diagrams illustrating a fabricating method of a third conductive pattern group according to the related art and the present invention, respectively;

FIG. 11 is a sectional diagram illustrating the thin film transistor substrate shown in FIG. 10;

FIGS. 12A to 12C are sectional diagrams illustrating a fabricating method of the thin film transistor substrate shown in FIG. 11.

DETAILED DESCRIPTION

Reference will now be made in detail to the preferred embodiments of the present invention, examples of which are illustrated in the accompanying drawings.

Hereinafter, a preferred embodiment of the present invention will be described in detail with reference to FIGS. 2 to 13.

Figure 1:
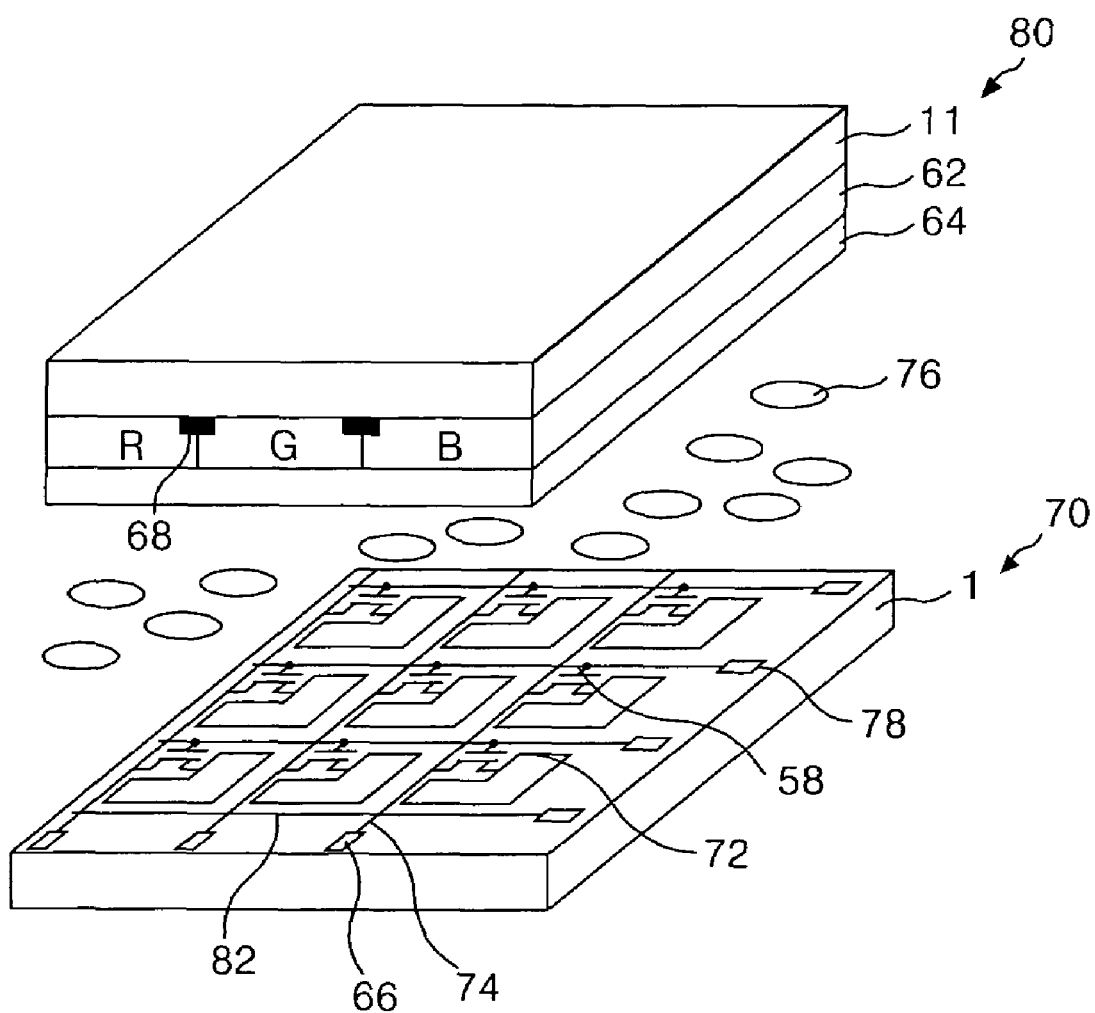
FIG. 1 is perspective view representing a related art liquid crystal display device.
Figure 2:
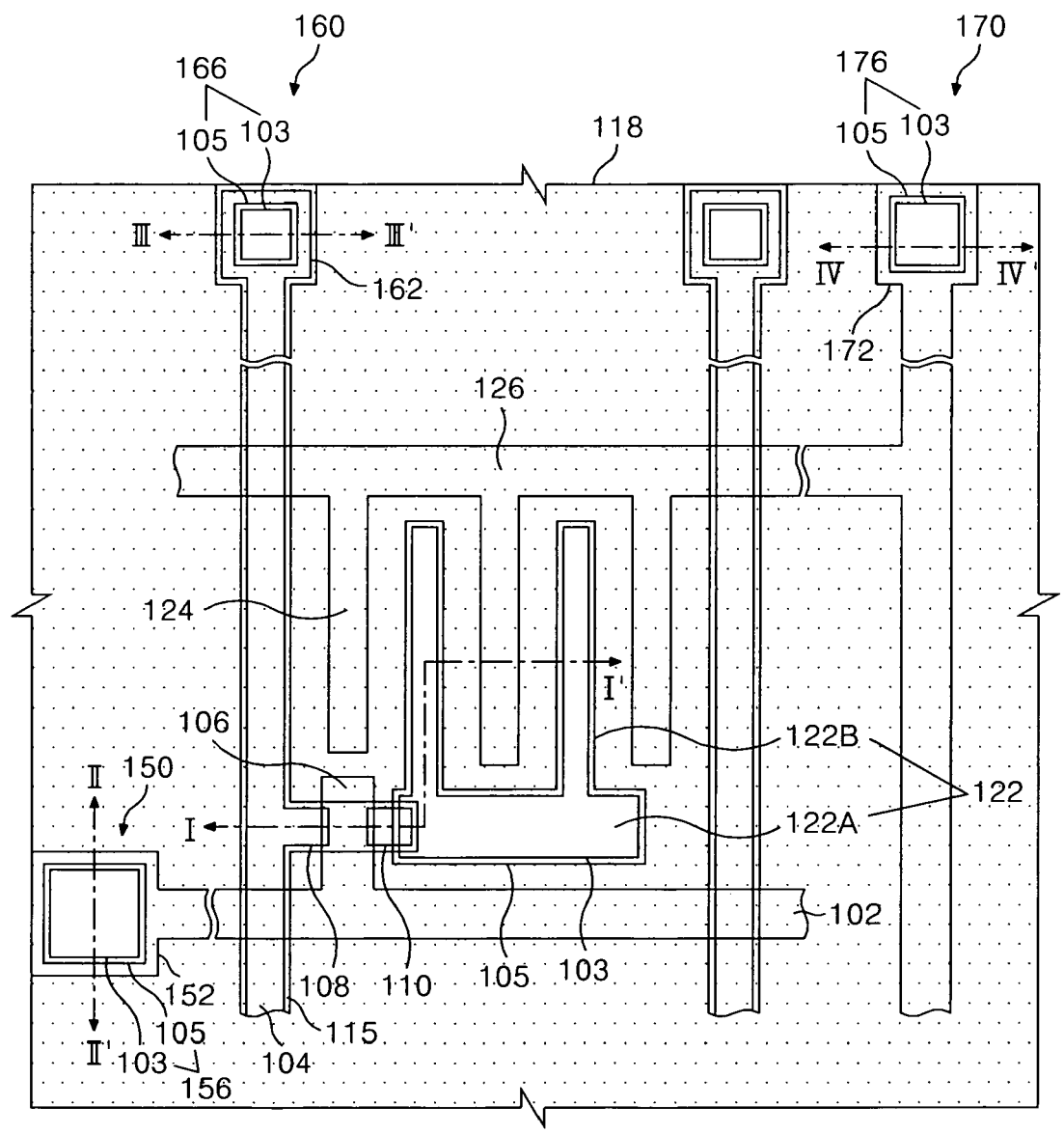
FIG. 2 is a plane view illustrating a thin film transistor substrate according to a first embodiment of the present invention.

FIG. 2 is a plane view representing a horizontal electric field type (or an IPS mode) thin film transistor array substrate according to the present invention. FIG. 3 is a sectional diagram representing the thin film transistor array substrate taken along the lines I-I', II-II', III-III' and IV-IV' in FIG. 2.

Referring to FIGS. 2 and 3, the IPS mode thin film transistor array substrate according to the present invention includes a gate line 102 and a data line 104 formed on a lower substrate 101 to cross; a thin film transistor formed at each intersection thereof; a pixel electrode 122 and a common electrode 124 which are formed to constitute a horizontal electric field at a pixel area provided in a crossing structure; and a common line 126 connected to the common electrode 124.

The thin film transistor has a pixel signal of the data line 104 charged and maintained in a pixel electrode 122 in response to a scan signal of the gate line 102. For this, the thin film transistor includes a gate electrode 106 connected to the gate line 102 and a source electrode 108 connected to the data line 104, and a drain electrode 110 connected to the pixel electrode 122. Further, the thin film transistor overlaps the gate electrode with a gate insulating film 112 therebetween and has an active layer 114 and an ohmic contact layer 116 further formed, wherein the active layer 114 forms a channel between the source electrode 108 and the drain electrode 110 and the ohmic contact layer 116 is formed for the ohmic contact between the source electrode 108 and the active layer 114 and between the drain electrode 110 and the active layer 114.

The pixel electrode 122 is formed on a substrate which is exposed through a pixel electrode pattern hole 120 that perforates a passivation film 118 and the gate insulating film 112. The pixel electrode 122 is formed having a border with the passivation film 118. As a result, the shape of the pixel electrode 122 is defined by the shape of the pixel electrode pattern hole 120. Particularly, the pixel electrode 122 is connected to a portion of the drain electrode 110 and includes a horizontal part 122A formed in parallel to the adjacent gate line 102 and a finger part 122B projected from the horizontal part 122A to be formed in parallel to the common electrode 124.

The common electrode 124 is connected to the common line 126 to be formed of the same metal as the gate line on the substrate of the pixel area. Particularly, the common electrode 124 is formed to be parallel to the finger part 122B of the pixel electrode 122 in the pixel area.

Accordingly, a horizontal electric field is formed between the pixel electrode to which a pixel signal is supplied through the thin film transistor, and a common electrode to which a reference voltage is supplied through a common line 126. Specially, the horizontal electric field is formed between the common electrode 124 and the finger part 122B of the pixel electrode 122. Due to the electric field in a horizontal direction, liquid crystal molecules arranged between the thin film transistor array substrate and the color filter array substrate rotate by dielectric anisotropy. The transmissivity of the light which transmits the pixel area is changed in accordance with the degree of rotation of the liquid crystal molecules, thereby realizing a picture.

The gate line 102 supplies a gate signal to the gate electrode 106 of the thin film transistor. The gate line 102 is connected to a gate driver (not shown) through a gate pad 150. The gate pad 150 comprises of a gate pad lower electrode 152 extended and expanded from the gate line 102, and a gate pad upper electrode 156 which is formed to have a border with the passivation film 118 and the gate insulating film 112 within a first contact hole 154 that exposes the gate pad lower electrode 152 by perforating the passivation film 118 and the gate insulating film 112.

The data line 104 supplies the pixel signal to the pixel electrode 122 through the drain electrode 110 of the thin film transistor. The gate line 102 and the data line 104 are formed to be in a cross structure, thereby defining a pixel area. The data line 104 is connected to a data driver (not shown) through the data pad 160. The data pad 160 comprises of a data pad lower electrode 162 extended and expanded from the data line 104, and a data pad upper electrode 166 which is formed to have a border with the passivation film 118 within a second contact hole 164 that exposes the data pad lower electrode 162 by perforating the passivation film 118.

The common line 126 is formed in parallel to the gate line 102 with the pixel area therebetween to supply a reference voltage to the common electrode 124 for driving the liquid crystal. The common line 126 is connected to a power supplier (not shown) through a common pad 170. The common pad 170 comprises of a common pad lower electrode 172 connected to the common line 126, and a common pad upper electrode 176 which is formed to have a border with the passivation film 118 and the gate insulating film 112 within a third contact hole 174 that exposes the common pad lower electrode 172 by perforating the passivation film 118 and the gate insulating film 112.

Further, a third conductive pattern inclusive of the pixel electrode 122, the gate pad upper electrode 156, the data pad upper electrode 166 and the common pad upper electrode 176 according to the present invention comprises of an opaque conductive layer 103 and a transparent conductive layer 105 which is formed to cover the opaque conductive layer 103. The opaque conductive layer 103 can be one of more of silver (Ag), copper (Cu), molybdenum (Mo), Chrome (Cr), Tungsten (W), aluminum (Al) group, and the like. And, the transparent conductive layer 105 is formed of indium thin oxide (ITO), indium zinc oxide (IZO), indium tin zinc oxide (ITZO) and the like.

The transparent conductive layer 105 is formed by having expanded width from both ends of the opaque conductive layer 103 to an aperture area by as much as a designated width (d). In this way, a light transmission area becomes wider by the transparent conductive layer 105 which is extended more to the aperture area than the opaque conductive layer 103 when compared with the case that the opaque conductive layer 105 is formed to be extended with the same width as the transparent conductive layer 105. Therefore, the present invention suggests the improved brightness of the LCD panel. Besides, the transparent conductive layer is formed to cover the opaque conductive layer of which the adhesive strength with the adjacent thin film is weak, thereby enabling to prevent the opaque conductive layer from peeling off. To describe this in detail, in case that the third conductive pattern group is formed only of the opaque conductive layer, a stripping solution which permeated between the adjacent thin film, e.g., the gate insulating film and the substrate, and the opaque conductive layer 103 with low adhesive strength upon the lift-off process to remove the opaque conductive layer 103 by the stripping solution. But, on the other hand, in case that the third conductive pattern group is formed of the opaque conductive layer 103 and the transparent conductive layer 105, it can be prevented that the stripping solution permeates between the opaque conductive layer 103 and the adjacent thin film, by the transparent conductive layer 105 formed to cover the opaque conductive layer 103 and the substrate even though the adhesive strength between the opaque conductive layer 103 and the adjacent thin film is weak.

Figure 4A:
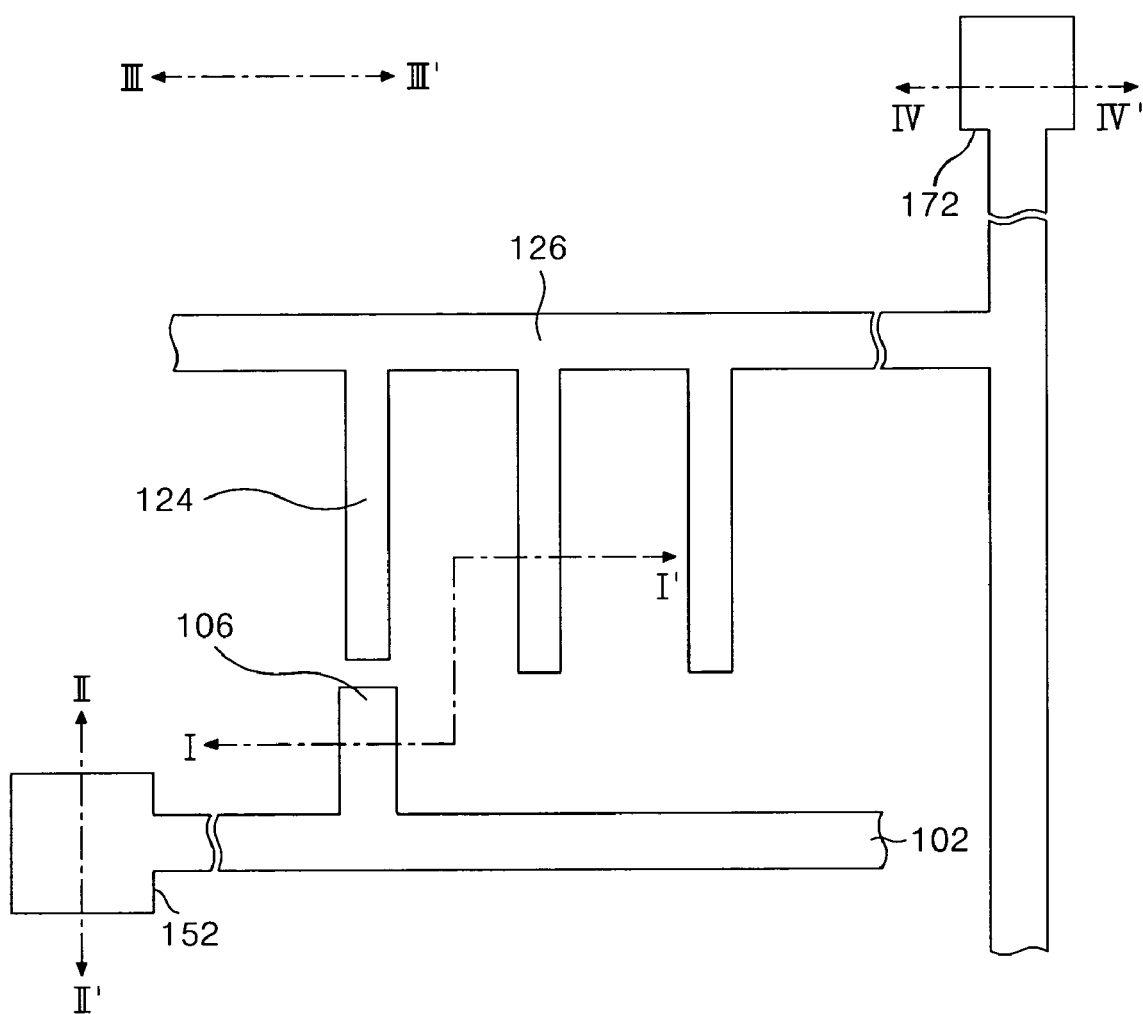

FIGS. 4A and 4B are a plane view and a sectional diagram for explaining a first mask process of the thin film transistor array substrate according to the present invention.

Referring to FIG. 4A, there is formed a first conductive pattern group inclusive of the gate line 102, the gate electrode 106, the common electrode 124, the common line 126, the common pad lower electrode 172 and the gate pad lower electrode 152 on the lower substrate 101 by the first mask process.

To describe this in detail, a gate metal layer is formed on the lower substrate 101 by a deposition method such as sputtering. Herein, the gate metal layer is of aluminum Al group metal, copper Cu, chrome Cr and so on. The gate metal layer is patterned by a photolithography process using a first photo mask and an etching process, thereby forming the first conductive pattern group inclusive of the gate line 102, the gate electrode 106, the common electrode 124, the common line 126, the common pad lower electrode 172 and the gate pad lower electrode 152.

Figure 5A:
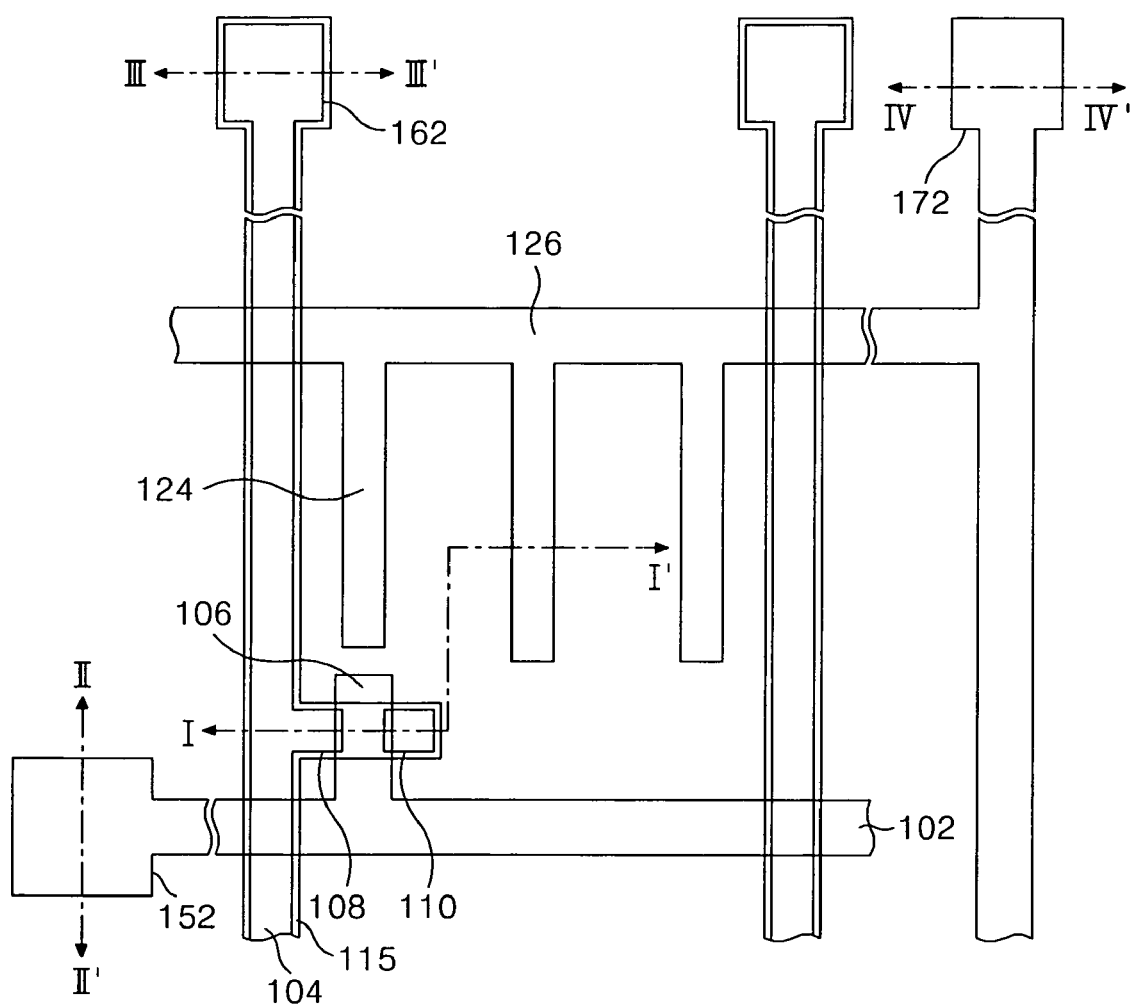

Referring to FIGS. 5A and 5B, a gate insulating film 112 is deposited on the lower substrate 101 where the first conductive pattern group is formed. Further, there are formed a second conductive pattern group and a semiconductor pattern 115 on top thereof by a second mask process, wherein the second conductive pattern group includes the data line 104, the source electrode 108, the drain electrode 110 and the data pad lower electrode 162, and the semiconductor pattern 115 includes an active layer 114 and an ohmic contact layer 116 which overlap along the second conductive pattern group. The semiconductor pattern 115 and the second conductive pattern group are formed by one mask process using a diffractive exposure mask or a halftone mask.

Specifically, there are sequentially deposited the gate insulating film 112, an amorphous silicon layer, an amorphous silicon layer doped with impurities (n+ or p+) and a source/drain metal layer on the lower substrate 101 where the first conductive pattern group is formed. For example, the gate insulating film 112, the amorphous silicon layer and the amorphous silicon layer doped with the impurities are deposited by a PECVD method, and the source/drain metal layer is deposited by a sputtering method. The gate insulating film 112 can be an inorganic insulating material such as silicon oxide SiOx, silicon nitride SiNx and so on, and the source/drain metal layer can be Cr,Mo, MoW, Al/Cr, Cu, Al(Nd), Al/Mo, Al(nd)/Al, Al(Nd)/Cr, Mo/Al(Nd)/Mo, Cu/Mo, Ti/Al(Nd)/Ti and the like.

And, after a photo-resist is spread over the source/drain metal layer, the photo-resist is exposed and developed by the photolithography process using the second mask of any one of the diffractive exposure mask and the halftone mask, thereby forming a photo-resist pattern with a stepped difference.

Subsequently, the source/drain metal layer is patterned by the etching process using the photo-resist pattern with the stepped difference to form the second conductive pattern group inclusive of the data line 104, the source electrode 108, the drain electrode 110 and the data pad lower electrode 162, and the semiconductor pattern 115 thereunder. In this case, the source electrode 108 and the drain electrode 110 out of the second conductive pattern group are not separated structure but have an integrated structure.

And then, the photo-resist pattern is ashed by an ashing process using oxygen $O_2$ plasma, thus the photo-resist pattern of an area corresponding to a channel part which is formed later is removed and the photo-resist pattern of the remaining area becomes thinner. And, the second conductive pattern group exposed by the etching process using the ashed photo-resist pattern, and the ohmic contact layer 116 thereunder are removed, thereby separating the source electrode 108 from the drain electrode 110 and exposing the active layer 114 there-between. Accordingly, there is formed a channel of the active layer 114 between the source electrode 108 and the drain electrode 110. At this moment, both sides of the second conductive pattern group are etched once again along the ashed photo-resist pattern, thus the second conductive pattern group and the semiconductor pattern 115 have a fixed stepped difference in a step shape.

And, the photo-resist pattern remaining on the second conductive pattern group is removed by a stripping process.

Figure 6A:
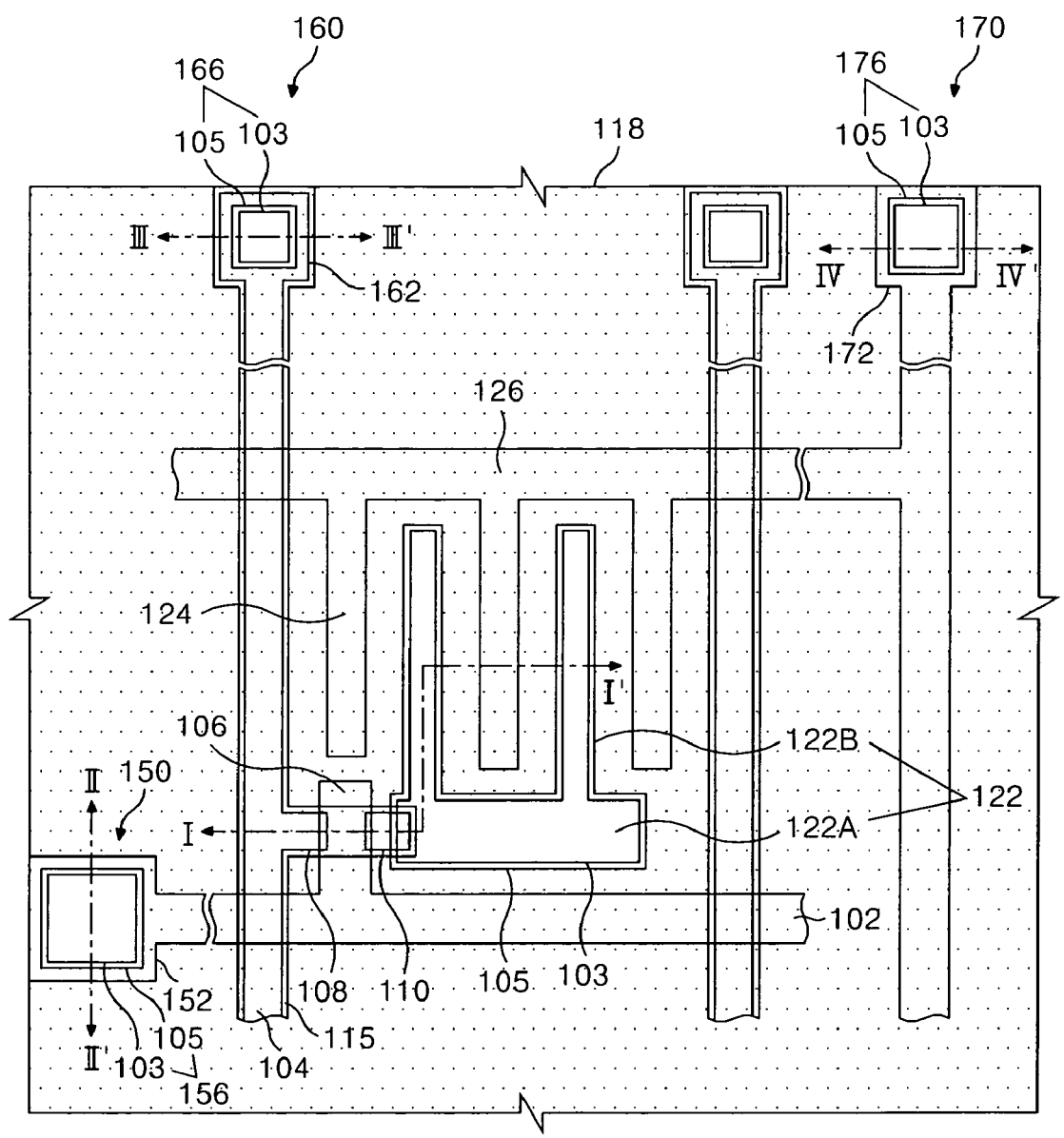

FIGS. 6A and 6B are a plane view and a sectional diagram representing a third mask process of the liquid crystal display device according to the first embodiment of the present invention.

Referring to FIGS. 6A and 6B, the passivation film 118 having first to third contact holes 120, 154, 164, 174 is formed by a third mask process on the lower substrate where the second conductive pattern group is formed, and then there is formed a third conductive pattern group inclusive of the pixel electrode 122, the gate pad upper electrode 156 and the data pad upper electrode 166. Herein, the third conductive pattern group is formed within the pattern hole and contact holes so as to make a border with the passivation film 118, but not overlapping the passivation film 118. This will be described in detail in conjunction with FIGS. 7A to 7E.

As shown in FIG. 7A, the passivation film 118 is deposited on the gate insulating film 112 where the second conductive pattern group is formed. The passivation film 118 can be an inorganic insulating material similar to the gate insulating film 111, or an organic insulating material. There is formed a negative type photo-resist pattern 190 on passivation film 118 by photolithography process using the third mask on the passivation film 118. At this moment, the negative type photo-resist pattern 190 is formed by having the exposed photo-resist remain upon the development process, thus it is formed in a reverse taper shape. The negative type photo-resist pattern 190 has an easier lift-off process than positive type photo-resist pattern. Detail descriptions on this will be made later in conjunction with FIGS. 8A and 8B.

Next, the passivation film 118 and the gate insulating film 112 are wholly patterned by an etching process, for example, a dry etching process, using the photo-resist pattern 190. Thus the first to third contact holes 120, 154, 164, 174, are formed as shown in FIG. 7B. At this moment, part of the second conductive pattern group which does not overlap the photo-resist pattern 190 might be etched with the ohmic contact layer 116 and the active layer 114 thereunder.

The pixel electrode pattern hole 120 is formed at a pixel area, where the pixel electrode 122 is to be formed, and exposes the substrate 101 and a side portion of the drain electrode 110. The first contact hole 154 perforates the gate insulating film 112 and the passivation film 118 to expose the gate pad lower electrode 152. The second contact hole 164 perforates the passivation film 118 to expose the data pad lower electrode 162. At this moment, the data pad lower electrode and the ohmic contact layer 116 and the active layer 114, which are under the data pad lower electrode 162, can be etched together to expose the remaining active layer 114 or gate insulating film 112 through the second contact hole 164. The third contact hole 174 perforates the gate insulating film 112 and the passivation film 118 to expose the common pad lower electrode 172.

Subsequently, the opaque conductive layer 103 and the transparent conductive layer 105 are sequentially deposited on the entire surface of the thin film transistor substrate and the photo resist pattern 190 as shown in FIG. 7C. When the opaque conductive layer 103 is deposited by sputtering method on the thin film transistor substrate, the sputtered particles are forwarding to the substrate in a straight direction. Therefore, the shape and size of the deposited opaque conductive layer through the pattern hole will have the shape and size defined by the pattern hole or contact hole. As a result, it has a size less than or equal to the minimum size of the pixel electrode pattern hole 120 and the contact holes 154, 164, 174. But, on the other hand, when the transparent conductive layer 105 is deposited on the thin film transistor substrate with directivity and non-directivity, it has not directivity in straight forward. As a result, it has a size not less than the maximum width of the pixel electrode pattern hole 120 and the contact holes 154, 164, 174. Further it has a wider width on the opaque conductive layer 103 than the opaque conductive layer 103. Herein, the opaque conductive layer 103 can be one of more of molybdenum (Mo), Chrome (Cr), Tungsten (W), aluminum (Al) group, copper (Cu), silver (Ag) and the like, and the transparent conductive film 105 can be indium tin oxide ITO, indium tin zinc oxide ITZO, tin oxide TO, indium zinc oxide IZO, or $SnO_2$.

The photo-resist pattern 190, and the opaque conductive layer 103 and the transparent conductive layer 105 thereon are removed together by the lift-off process, thereby patterning the opaque conductive layer 103 and the transparent conductive layer 105. Accordingly, there is formed a third conductive pattern group inclusive of the pixel electrode 122, the gate pad upper electrode 156, the data pad upper electrode 166 and the common pad upper electrode 176, as shown in FIG. 7D. The third conductive pattern group has a border with the patterned passivation film 118 and the patterned gate insulating film 112.

Specifically, the pixel electrode 122 is formed to have a border with the passivation film with in the pixel electrode pattern hole 120 to be connected with the drain electrode 110. The gate pad upper electrode 156 is formed within a border defined by the passivation film to be connected with the gate pad lower electrode 152 within the first contact hole 154. The data pad upper electrode 166 is formed within a border defined by the passivation film 118 within the second contact hole 164. The common pad upper electrode 176 is formed within a border defined by the passivation film 150 within the third contact hole 174.

Figure 8A:
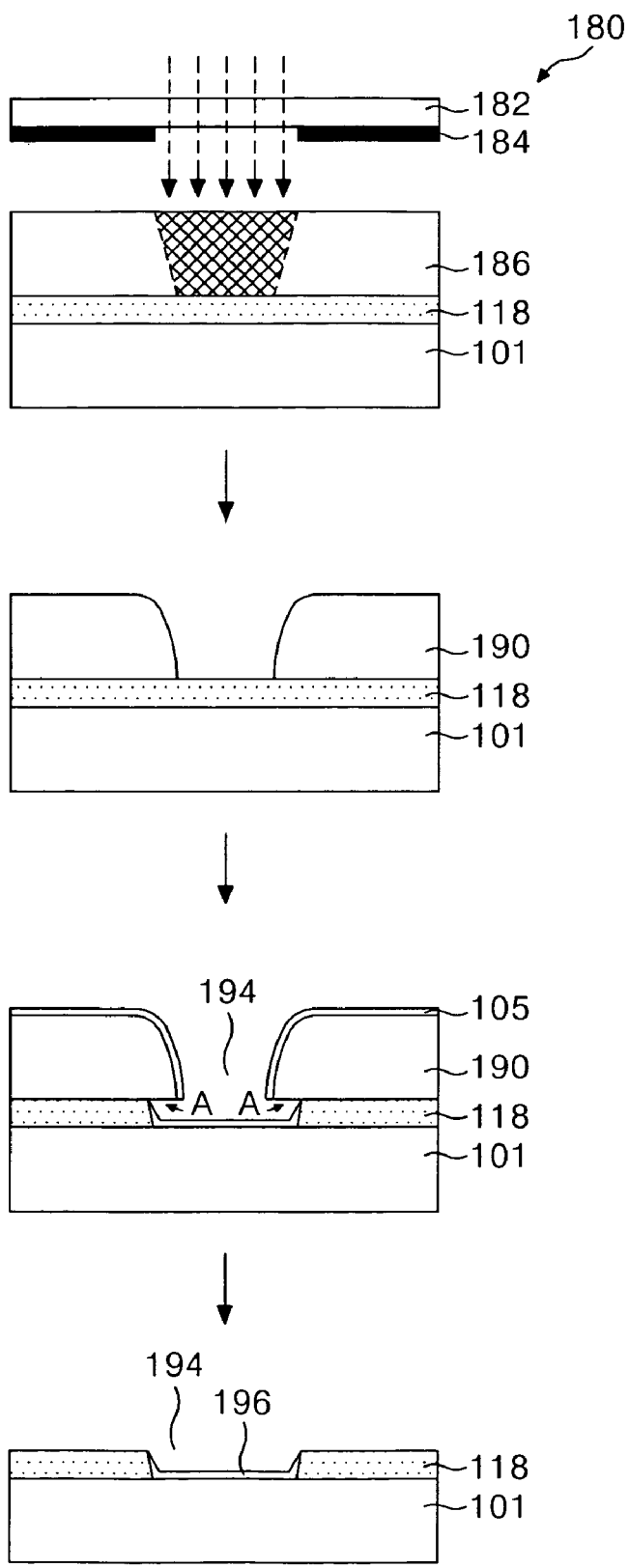
FIGS. 8A and 8B are sectional diagrams illustrating a lift-off process by use of a positive type photo-resist pattern and a negative type photo-resist pattern.
Figure 8B:
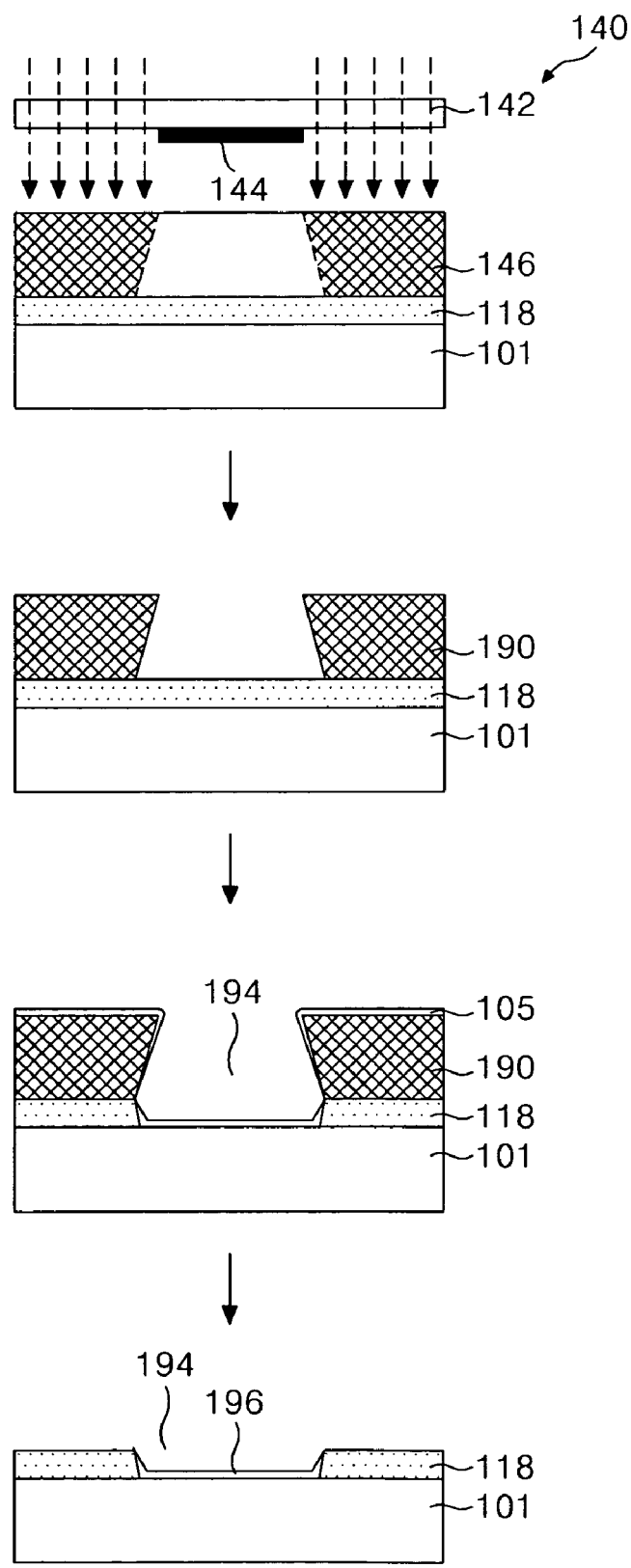

FIGS. 8A and 8B are sectional diagrams illustrating representing a lift-off process using a positive type photo-resist pattern and a lift-off process using a negative type photo-resist pattern, respectively.

Referring to FIG. 8A, the positive type photo-resist 186 is spread over the lower substrate 101 where the passivation film 118 is deposited. A photo mask 180 is aligned in the upper part of the lower substrate 101 where the photo-resist 186 is deposited. The photo mask 180 includes a mask substrate 182 and a shielding layer 184 formed on the mask substrate 182. The photo-resist 186 is patterned by an exposure process and a development process using the photo mask 180, thereby forming the photo-resist pattern 190. The photo-resist pattern 190 is formed by having the photo-resist 186, to which light is irradiated upon the exposure process, selectively removed by a developing solution. Specially, the exposure amount given to the photo resist 186 which is located at an area relatively remote from the shielding layer 184 is less than the exposure amount given to the photo resist 186 which is located at an adjacent area to the shielding layer 184 upon the exposure process. Accordingly, the photo resist pattern 190 is formed in the taper shape that the width of the upper part thereof is bigger than the width of the lower part thereof. The passivation film 118 is etched by use of the photo resist pattern 190 to form the pattern (or contact) hole 194. At this moment, the passivation film is over-etched (A) at the part where the pattern (or contact) hole 194 is formed to make the lift-off process easier so that the edge part of the photo resist pattern 190 is projected more than the edge part of the passivation film 188. Subsequently, the transparent conductive layer 105 is formed on the entire surface of the thin film transistor substrate where the photo resist pattern 190 exists, by a deposition method such as sputtering. The photo resist pattern 190 and the transparent conductive layer 105 thereon are removed together by the lift-off process, thereby patterning the transparent conductive layer 105. Accordingly, the third conductive pattern group 196 is formed within the pattern (or contact) hole 194.

At this moment, the edge part of the projected photo resist pattern 190 causes the transparent conductive layer 105 to be open between the edge part of the passivation film 118 and itself, or the transparent conductive layer 105 is deposited to be relatively thin, so that a stripper can penetrate easily. As a result, the photo resist pattern covered with the transparent conductive layer 105 is easily separated from the passivation film 118 by the stripper.

In this way, the lift-off process using the positive type photo resist pattern 190 can become complicated, since, the passivation film should be over-etched for the stripper to easily penetrate between the photo resist pattern 190 and the passivation film 118.

Now, a lift-off process using a negative type photo-resist pattern will be explained. The negative type photo resist 146 is spread over the entire surface of the lower substrate 101 where the passivation film 118 shown in FIG. 8B is deposited. A photo mask 140 is aligned on the upper part of the lower substrate where the photo resist 146 is spread. The photo mask 140 includes the mask substrate 142 and the shielding layer 144 formed on the mask substrate 142. The photoresist 146 is patterned by the exposure process and the development process using the photo mask 140, thereby forming the photo resist pattern 190. The photo resist pattern 190 is formed by having the photo resist 186, to which no light is irradiated upon the exposure process, selectively removed by the developing solution. Accordingly, the photo resist pattern 190 is formed in the reverse taper shape where the width of the upper part thereof is smaller than the width the lower part thereof. The passivation film 118 is etched by use of the photo resist pattern 190 of the reverse taper shape, thereby forming the pattern (or contact) hole 194. Subsequently, the transparent conductive layer 105 is formed on the entire surface of the thin film transistor substrate where the photo resist pattern 190 exists, by the deposition method such as sputtering. Then, the photo resist pattern 190 and the transparent conductive layer 105 thereon are removed together by the lift-off process to pattern the transparent conductive layer 105. Accordingly, the third conductive pattern group 196 is formed within the pattern (or contact) hole 194.

At this moment, the photo resist pattern 190 of the reverse taper shape causes the transparent conductive layer 105 to be open between the edge part of the passivation film 118 and itself, or the transparent conductive layer 105 is deposited to be relatively thin, so that a stripper can penetrate easily. As a result, the photo resist pattern covered with the transparent conductive layer 105 is easily separated from the passivation film 118 by the stripper.

In this way, the lift-off process using the negative type photo resist pattern 190 has the stripper easily penetrate between the photo resist pattern 190 and the passivation film 118 by the photo resist pattern 190 of the reverse taper shape, thus a separate passivation over-etching process is not required.

As described above, the lift-off process using the negative type photo resist pattern does not require the passivation film over-etching process which is required in the lift-off process using the positive type photo resist pattern, thus the process is simplified.

Figure 9A:
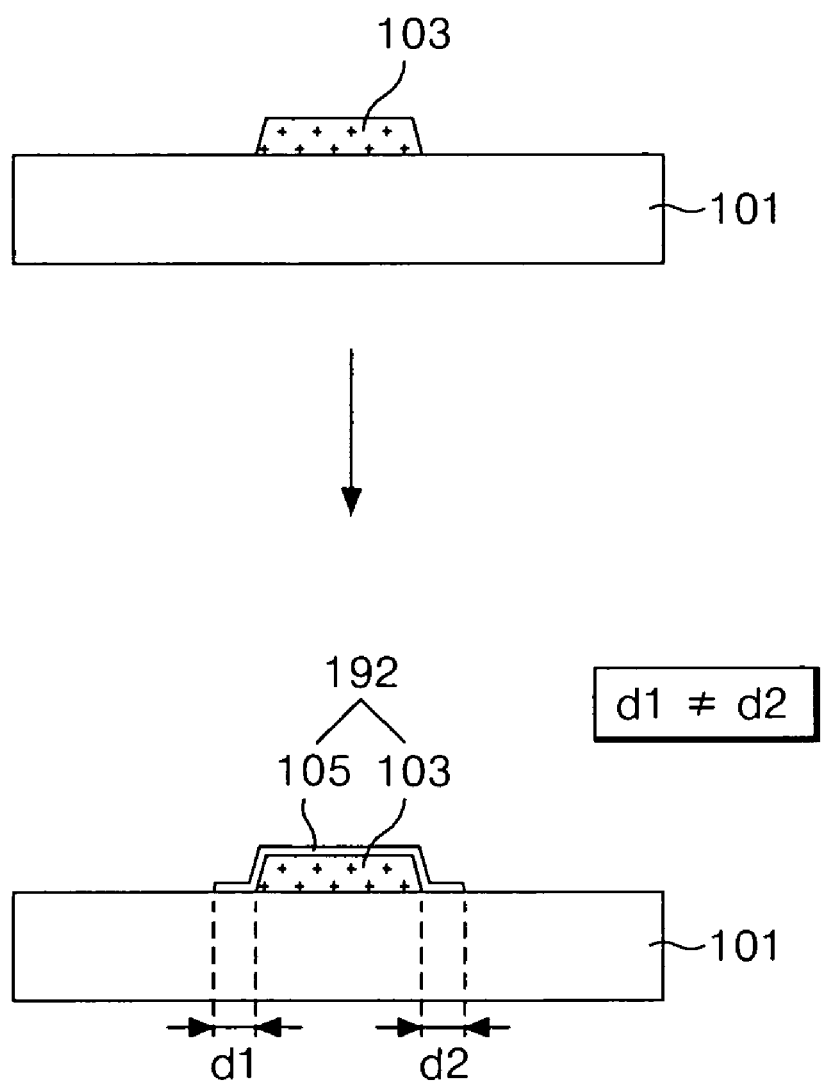

FIGS. 9A and 9B are sectional diagrams representing a fabricating method of a pixel electrode according to the related art and the present invention.

Referring to FIG. 9A, the third conductive pattern group inclusive of the related art pixel electrode is formed of the opaque conductive layer 103 and the transparent conductive layer 105, which is formed over the opaque conductive layer 103, in two mask processes. The opaque conductive layer 103 is formed on the substrate 101 by a first mask process. The transparent conductive layer 105 is formed by a second mask process to cover the opaque conductive layer 103 on the substrate 101 where the opaque conductive layer 103 is formed. At this moment, the transparent conductive layer 105 is formed to have expanded width as much as a designated width from the opaque conductive layer 103. However, in case that a mis-alignment of the photo mask is generated upon the second mask process, a first width D1 and a second width D2 which are wider portions of the transparent conductive layer 105 than the width of the opaque conductive layer 103 become different. For any case, the difference between the first and second widths d1, d2 should not be greater than 1 μm. Due to this requirement, there is a problem in that the design margin would be limited. Further its process becomes complicated since the transparent conductive pattern group inclusive of the pixel electrode should be formed in two mask processes.

Referring to FIG. 9B, the third conductive pattern group inclusive of the pixel electrode according to the present invention is formed of the opaque conductive layer 103 and the transparent conductive layer 105, which is formed on the opaque conductive layer 103 to have wider width expanded outward by as much as a designated width from the opaque conductive layer 103, in one mask process. The third conductive pattern group is formed on the substrate 101 by the lift-off process using the photo resist pattern which is formed by one mask process. In this case, the opaque conductive layer 103 and the transparent conductive layer 105 are formed in the same mask process, thus no defect such as mis-alignment is generated. Accordingly, the first and second widths d1, d2 which are expanded portions of the transparent conductive layer 105 from the edge of the opaque conductive layer 103 become identical.

Figure 10:
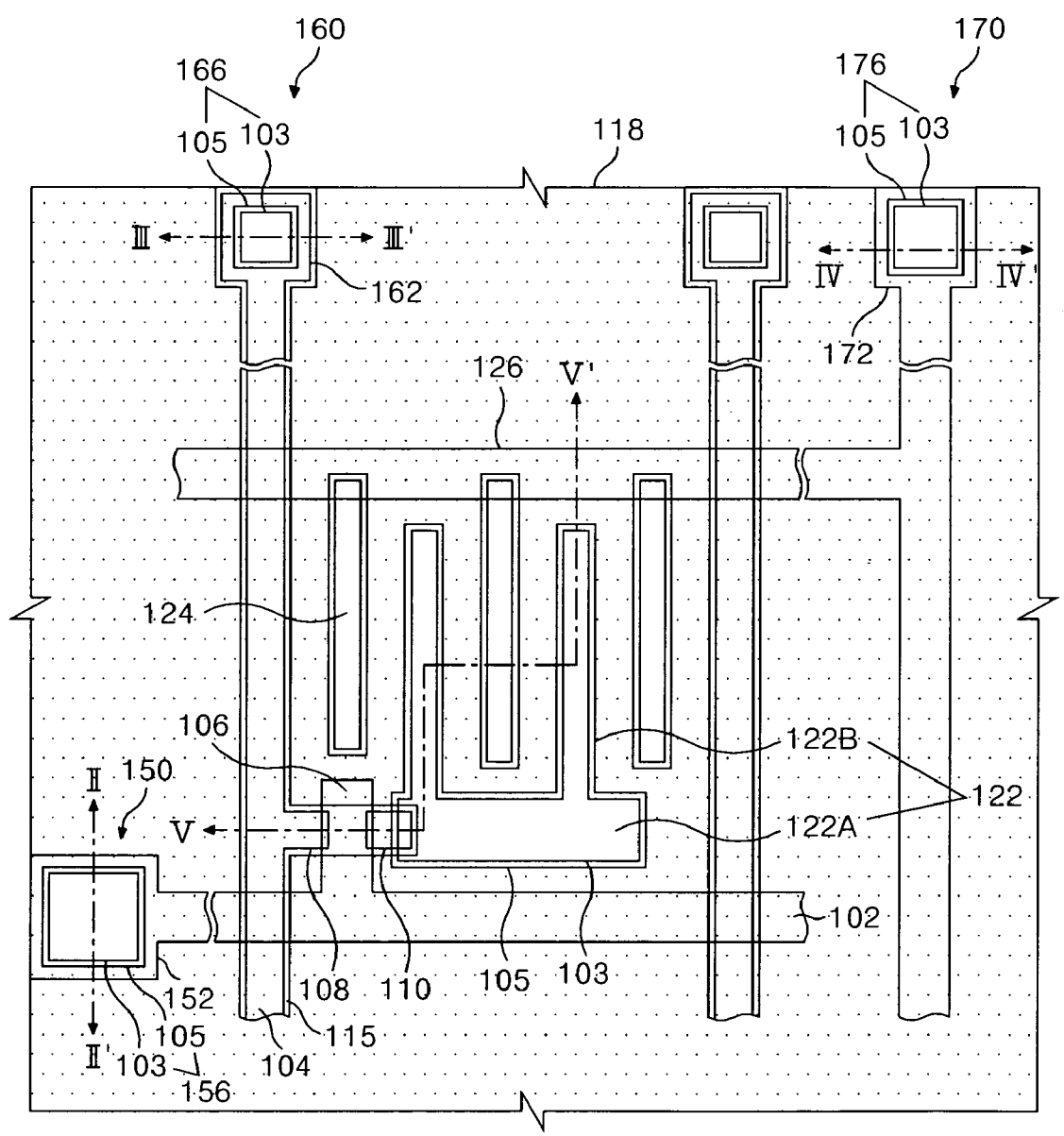
FIG. 10 is a plane view illustrating a thin film transistor substrate according to a second embodiment of the present invention.

FIG. 10 is a plane view representing a thin film transistor substrate according to the second embodiment of the present invention, and FIG. 11 is a sectional diagram representing the thin film transistor substrate shown in FIG. 10.

The thin film transistor substrate shown in FIGS. 10 and 11 has the same components as the thin film transistor substrate shown in FIGS. 2 and 3 except that the common electrode is formed at the same step and by the same method as the pixel electrode. Accordingly, detail description on the same components will be omitted.

The common line 126 is formed in parallel to the gate line 102 with the pixel area therebetween, and supplies a reference voltage for driving liquid crystal to the common electrode 124. The common line 126 is formed of the same metal as the gate line 102 on the lower substrate 101.

The common electrode 124 is connected to the common line 126 through a common electrode pattern hole 121 that exposes one side portion of the common line 126. Particularly, the common electrode 124 is formed in parallel to the finger part 122B of the pixel electrode 122 at the pixel area.

Accordingly, a horizontal electric field is formed between the pixel electrode 122 to which the pixel signal is supplied through the thin film transistor and the common electrode 124 to which the reference voltage is supplied through the common line 126. Particularly, the horizontal electric field is formed between the finger part 122B of the pixel electrode 122 and the common electrode 124. Liquid crystal molecules, which are arranged in a horizontal direction between the thin film transistor array substrate ad the color filter array substrate by the horizontal electric field, rotate by dielectric anisotropy. The transmissivity of the light transmitting the pixel area in accordance with the degree of rotation of the liquid crystal molecules, thereby realizing a picture.

On the other hand, according to the second embodiment of the present invention, the third conductive pattern group inclusive of the pixel electrode 122, the common electrode 124, the gate pad upper electrode 156, the data pad upper electrode 166 and the common pad upper electrode 176 is formed of the opaque conductive layer 103 and the transparent conductive layer 105 formed to cover the opaque conductive layer 103.

The transparent conductive layer 105 is formed by having a larger size expanded from both ends of the opaque conductive layer 103 to the aperture area by as much as the designated width (d). In this way, the light transmission area becomes wider when compared with the case that the opaque conductive layer 103 is expanded with the same width as the transparent conductive film 105 by the transparent conductive layer 105 expanded more to the aperture area than the opaque conductive layer 103, thereby improving the brightness. Besides, the transparent conductive layer is formed to cover the opaque conductive layer which has a weak adhesive strength with the adjacent thin film, thus a peeling phenomenon of the opaque conductive layer can be prevented.

Figure 12A:
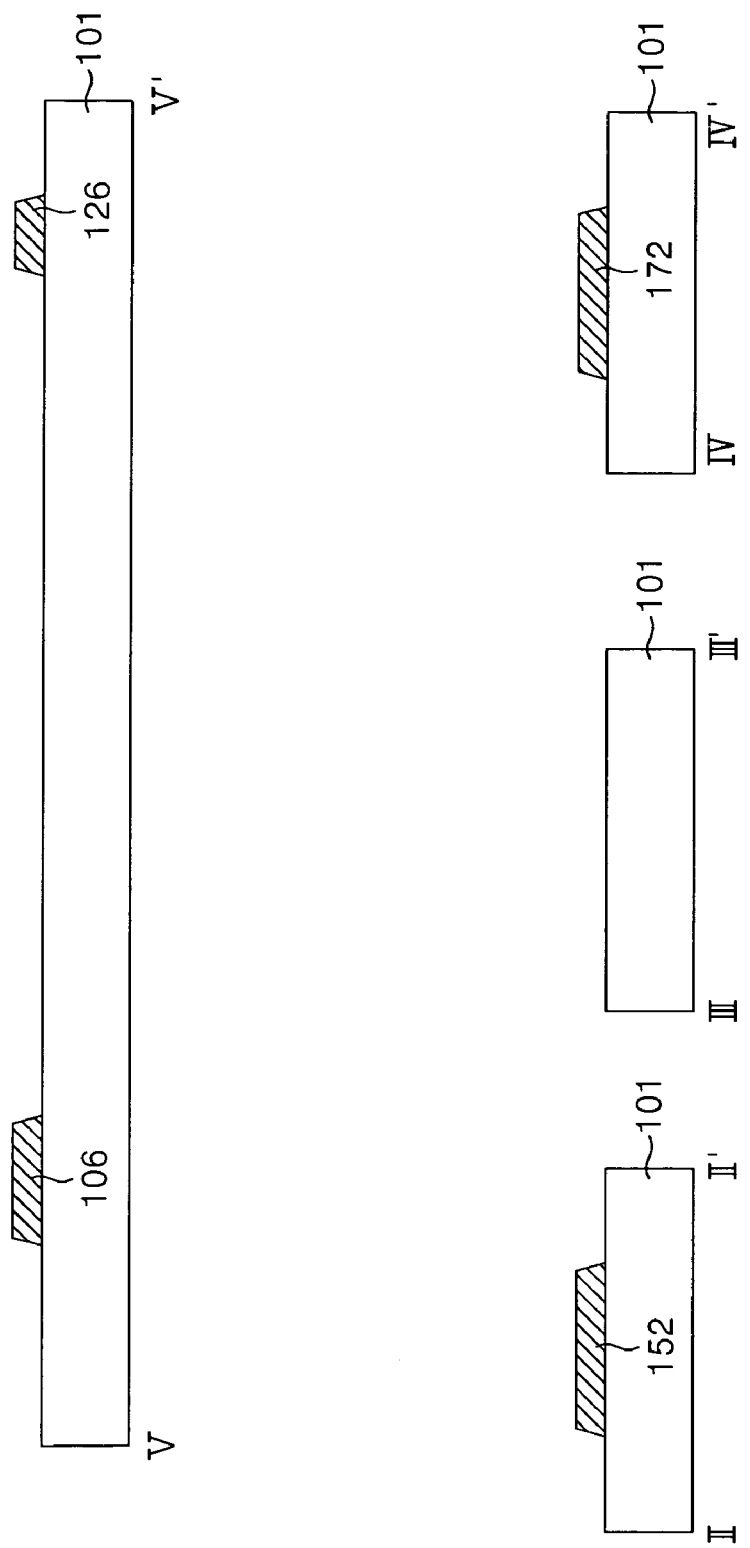
Figure 12C:
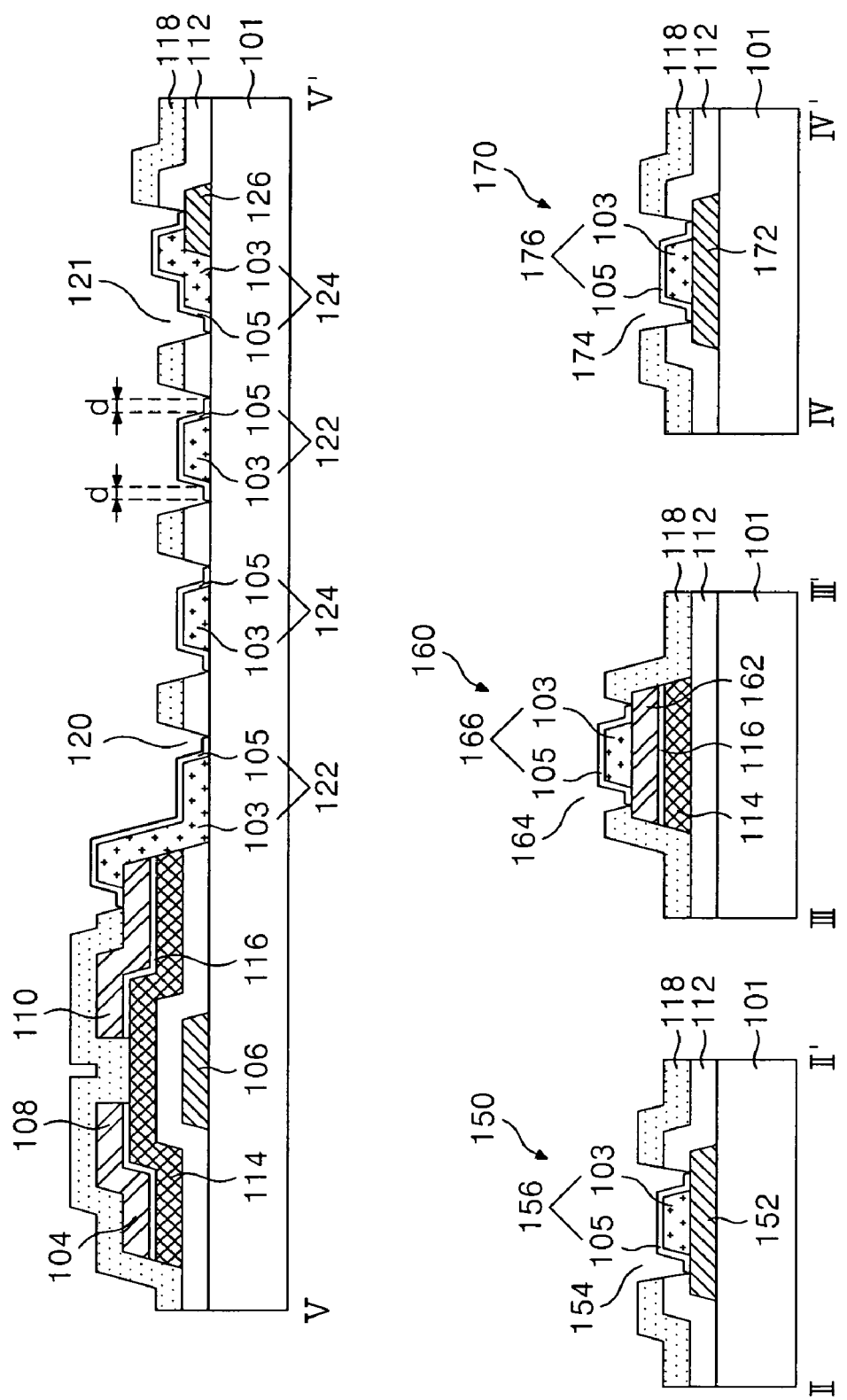

FIGS. 12A to 12C are sectional diagrams representing a fabricating method of the thin film transistor substrate shown in FIG. 11.

As shown in FIG. 12A, there is formed a first conductive pattern group inclusive of the gate line 102, the gate electrode 106, the common line 126, the common pad lower electrode 172 and the gate pad lower electrode 152 on the lower substrate by a first mask process.

As shown in FIG. 12B, the gate insulating film 112 is deposited on the lower substrate where the first conductive pattern group is formed, and a second conductive pattern group and a semiconductor pattern are formed thereon by a second mask process using a semi transmission mask or diffractive mask, wherein the second conductive pattern group includes the data line 104, the source electrode 108, the drain electrode 110, the data pad lower electrode 162, and the semiconductor pattern 115 includes the active layer 114 and the ohmic contact layer 116 along the rear surface of the second conductive pattern group.

As shown in FIG. 12C, the passivation film 118 having first to common electrode pattern holes 120, 154, 164, 174, 121 is formed on the lower substrate 101, where the second conductive pattern group is formed, by a third mask process which includes the lift-off process, and there is formed a third conductive pattern group inclusive of the pixel electrode 122, the common electrode 124, the gate pad upper electrode 15, the data pad upper electrode 166 and the common pad upper electrode 176. Herein, the third conductive pattern group is formed within a border defined by the passivation film 118 and the gate insulating film 112 without overlapping it.

Figure 13:
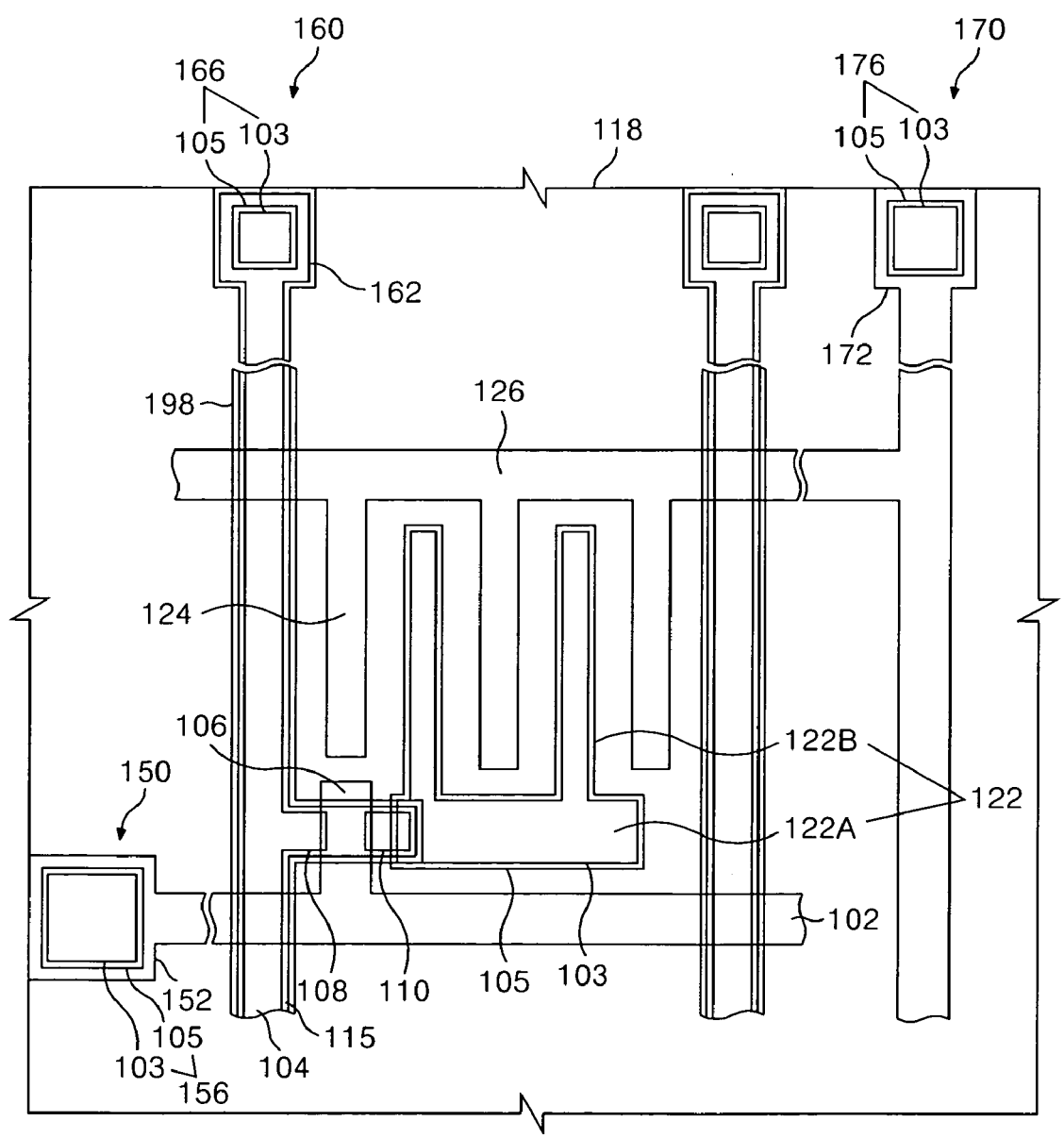
FIG. 13 is a plane view illustrating a thin film transistor substrate according to a third embodiment of the present invention.

FIG. 13 is a plane view representing a thin film transistor substrate according to a third embodiment of the present invention.

The thin film transistor substrate shown in FIG. 13 has the same components as the thin film transistor substrate shown in FIGS. 2 and 3 except that it further includes a redundancy line. Accordingly, the detail description on the same components will be omitted.

The redundancy line 198 is formed to overlap at least one signal line of the gate line 102, the data line 104 and the common line 126. The redundancy line 198 is formed of the same material as the pixel electrode 122 on the same plane. The redundancy line 198 makes the data signal supplied to the thin film transistor through the redundancy line 198 when an open is generated in the signal line, e.g., the data line 104. Further, in case the data signal is supplied to the thin film transistor through the redundancy line 198, the redundancy line 198 is connected with the data line 104 to reduce the line resistance of the redundancy line 198.

As described above, in the thin film transistor substrate and the fabricating method thereof according to the present invention, the transparent conductive layer is formed by being extended from both ends of the opaque conductive layer to the aperture area by as much as the designated width by one mask process. The light transmission area is broadened to improve the brightness when compared with the case that the opaque conductive layer is formed by being extended in the same width as the transparent conductive layer, by the transparent conductive layer extended more to the aperture area by as much as the designated width than the opaque conductive layer. Further, the opaque conductive layer is located at the lower part of the transparent conductive layer, thus the light going out toward the upper substrate can be reduced by the opaque conductive layer when realizing black in the normally black mode, thus the light leakage phenomenon is improved to improve the contrast ratio. In addition, the transparent conductive layer is formed to cover the opaque conductive layer, of which the adhesive strength with the adjacent thin film is weak, thus the peeling phenomenon of the opaque conductive layer can be prevented.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A fabricating method of a liquid crystal display device comprising:

performing a first mask process comprising forming a first conductive pattern group having a gate line on a substrate, a gate electrode connected to the gate line, a common line formed in parallel to the gate line and a common electrode connected to the common line;

forming a gate insulating film overlying the first conductive pattern group;

a second mask process comprising forming a second conductive pattern group having a data line crossing the gate line on the gate insulating film and defining a pixel area, a source electrode connected with the data line, and a drain electrode opposite to the source electrode, and a semiconductor pattern forming a channel between the source electrode and the drain electrode;

forming a passivation film to cover the second conductive pattern group and the semiconductor pattern;

a third mask process comprising forming a pattern hole perforating the passivation film and the gate insulating film, and a third conductive pattern group within a border defined by the passivation film within the pattern hole and having a pixel electrode constituting a horizontal electric field with the common electrode, and wherein the pixel electrode comprises a first conductive layer and a second conductive layer overlying the first conductive layer.

2. The fabricating method according to claim 1, further comprising:

forming a gate pad lower electrode connected to the gate line during the first mask process; and forming a contact hole perforating the gate insulating film and the passivation film and exposing the gate pad lower electrode during the third mask process, and forming a gate pad upper electrode within a border defined by the passivation film within the contact hole, the upper electrode comprising a first conductive layer and a second conductive layer overlying the first conductive layer.

3. The fabricating method according to claim 1, further comprising:

forming a data pad lower electrode connected with the data line during the second mask process; and forming a contact hole perforating the passivation film and exposing the data pad lower electrode during the third mask process, and a data pad upper electrode which is formed within a border defined by the passivation film within the contact hole, the upper electrode comprising a first conductive layer and a second conductive layer overlying the first conductive layer.

4. The fabricating method according to claim 1, wherein the third mask process comprises the steps of:
   forming a photo resist pattern of a reverse taper shape on the passivation film;
   forming the contact hole by etching the protective film using the photo resist pattern as a mask;
   forming the first and second conductive layers overlying the photo resist pattern; and
   forming a pixel electrode by removing the photo resist pattern, wherein the first and second conductive layers remain in the third contact hole.

5. The fabricating method according to claim 4, wherein forming the photo resist pattern comprises exposing and developing a negative type photo resist.

6. The fabricating method according to claim 1, wherein the width of the second conductive layer is the same in four sides of the second conductive layer.

7. The fabricating method according to claim 1, wherein the first conductive layer one of Ag, Cu, Mo, Cr, and W, and the second conductive layer comprises a transparent conductive material.

8. The fabricating method according to claim 1, wherein the second conductive layer expands more outward than the first conductive layer.

9. A method for fabricating a liquid crystal display device that includes a gate line on a substrate, a data line to provide crossing the gate line with a gate insulating film there between and defining a pixel area, a common line formed in parallel to the gate line, a thin film transistor connected to the gate line and the data line, a passivation film overlying the thin film transistor, a pattern hole perforating the passivation film, a pixel electrode connected to the thin film transistor, and a common electrode connected to the common line to form a horizontal electric field with the pixel electrode, wherein the step of forming at least one of the gate line, the data line, the common line, the pixel electrode and the common electrode comprises the steps of:
   forming an insulation film on the substrate;
   forming a photo resist pattern of a reverse taper shape on the insulation film;
   forming the pattern hole by etching the insulation film using the photo resist pattern as a mask;
   forming a first conductive layer having a first width within the contact hole to cover the photo resist pattern;
   forming a second conductive layer to cover the first conductive layer by having it expanded more outward than the first conductive layer, wherein the second conductive layer has a second width which is wider than the first width; and
   patterning the first and second conductive layers by removing the photo resist pattern in which the first and second conductive layers remain behind.

10. The fabricating method according to claim 7, wherein at least one of the pixel electrode and the common electrode comprises the first conductive layer and the second conductive layer overlying the first conductive layer and within a border defined by the passivation film within the pattern hole.

* * * * *

UNITED STATES PATENT AND TRADEMARK OFFICE
CERTIFICATE OF CORRECTION

PATENT NO.        : 7,351,600 B2
APPLICATION NO. : 11/172036
DATED             : April 1, 2008
INVENTOR(S)       : Soon Sung Yoo et al.

It is certified that error appears in the above-identified patent and that said Letters Patent is hereby corrected as shown below:

On the Title Page

In column 2, line 12, before "one of the gate line" delete "lease" and substitute --least-- in its place.

In the Claims

Column 15, in claim 7, line 3, after "conductive layer" delete "comprises" and substitute --is comprised of-- in its place.

Signed and Sealed this

Second Day of September, 2008

JON W. DUDAS
*Director of the United States Patent and Trademark Office*